United States Patent
Laine et al.

(10) Patent No.: US 10,749,665 B2
(45) Date of Patent: Aug. 18, 2020

(54) HIGH-PRECISION RATIONAL NUMBER ARITHMETIC IN HOMOMORPHIC ENCRYPTION

(71) Applicant: Microsoft Technology Licensing, LLC, Redmond, WA (US)

(72) Inventors: Kim Henry Martin Laine, Seattle, WA (US); Hao Chen, Seattle, WA (US); Yuhou Xia, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 15/638,181

(22) Filed: Jun. 29, 2017

(65) Prior Publication Data
US 2019/0007197 A1    Jan. 3, 2019

(51) Int. Cl.
*H04L 9/00* (2006.01)
*H04L 9/06* (2006.01)
*H04L 9/30* (2006.01)

(52) U.S. Cl.
CPC ............ *H04L 9/008* (2013.01); *H04L 9/0618* (2013.01); *H04L 9/3093* (2013.01); *H04L 2209/08* (2013.01)

(58) Field of Classification Search
CPC ...... H04L 9/008; H04L 9/0618; H04L 9/3093
See application file for complete search history.

(56) References Cited

U.S. PATENT DOCUMENTS

| | | | |
|---|---|---|---|
| 6,772,339 B1 | 8/2004 | Jakobsson et al. | |
| 8,429,421 B2 | 4/2013 | Chase et al. | |
| 8,515,058 B1 * | 8/2013 | Gentry | H04L 9/008 380/28 |

(Continued)

FOREIGN PATENT DOCUMENTS

EP    2924911 A1    9/2015

OTHER PUBLICATIONS

Beck, "Approximate Two-Party Privacy-Preserving String Matching with Linear Complexity", In Proceedings of IEEE International Congress on Big Data, BigData Congress, Jun. 27, 2013, 14 pages.

(Continued)

*Primary Examiner* — Joshua D Taylor
(74) *Attorney, Agent, or Firm* — Alleman Hall Creasman & Tuttle LLP

(57) ABSTRACT

In aspects of high-precision rational number arithmetic in homomorphic encryption, a computing device stores homomorphic encrypted data as a dataset, and implements an encryption application that can encode integers into plaintext polynomials, where the integers are representative of initial data received for encryption. The encryption application can encrypt the plaintext polynomials into ciphertexts of the homomorphic encrypted data, and perform homomorphic operations as rational number arithmetic on the ciphertexts, generating updated ciphertexts while the homomorphic encrypted data remains encrypted. The encryption application can then decrypt the updated ciphertexts to modified plaintext polynomials that can be resolved back to the plaintext polynomials effective to recover the integers that represent the initial data. The encryption application can also decode the modified plaintext polynomials back to the integers effective to recover the initial data in an unencrypted form.

18 Claims, 5 Drawing Sheets

(56) References Cited

U.S. PATENT DOCUMENTS

| | | | |
|---|---|---|---|
| 8,903,083 | B2 | 12/2014 | Gentry et al. |
| 9,202,079 | B2 | 12/2015 | Kaliski, Jr. |
| 9,436,835 | B1 | 9/2016 | Saldamli |
| 10,075,288 | B1* | 9/2018 | Khedr ............... H04L 9/008 |
| 10,116,437 | B1 | 10/2018 | Krendelev |
| 2002/0027986 | A1 | 3/2002 | Brekne |
| 2004/0078414 | A1 | 4/2004 | Geiringer et al. |
| 2007/0116283 | A1 | 5/2007 | Tuyls et al. |
| 2008/0294909 | A1 | 11/2008 | Ostrovsky et al. |
| 2009/0327748 | A1 | 12/2009 | Agrawal et al. |
| 2010/0020965 | A1 | 1/2010 | Gueron et al. |
| 2011/0110525 | A1 | 5/2011 | Gentry |
| 2012/0039463 | A1 | 2/2012 | Gentry et al. |
| 2012/0039473 | A1 | 2/2012 | Gentry et al. |
| 2013/0014270 | A1 | 1/2013 | Sy et al. |
| 2013/0024653 | A1 | 1/2013 | Gove |
| 2013/0170640 | A1 | 7/2013 | Gentry |
| 2013/0216044 | A1 | 8/2013 | Gentry et al. |
| 2013/0329883 | A1 | 12/2013 | Tamayo-rios |
| 2014/0177828 | A1 | 6/2014 | Loftus |
| 2014/0215222 | A1 | 7/2014 | Sakumoto et al. |
| 2014/0233727 | A1 | 8/2014 | Rohloff et al. |
| 2014/0325230 | A1 | 10/2014 | Sy et al. |
| 2015/0033018 | A1* | 1/2015 | Tateishi ............ H04L 63/08 713/171 |
| 2015/0039912 | A1 | 2/2015 | Payton et al. |
| 2015/0046450 | A1 | 2/2015 | Yoshino et al. |
| 2015/0046708 | A1 | 2/2015 | Yasuda et al. |
| 2015/0280914 | A1 | 10/2015 | Yasuda et al. |
| 2015/0288665 | A1 | 10/2015 | El Emam et al. |
| 2015/0295716 | A1 | 10/2015 | Liu |
| 2015/0312031 | A1 | 10/2015 | Seo et al. |
| 2015/0358153 | A1 | 12/2015 | Gentry |
| 2015/0365229 | A1 | 12/2015 | Patey et al. |
| 2016/0105402 | A1 | 4/2016 | Soon-shiong et al. |
| 2016/0119119 | A1 | 4/2016 | Calapodescu et al. |
| 2016/0191233 | A1 | 6/2016 | Loftus |
| 2017/0134157 | A1 | 5/2017 | Laine et al. |
| 2017/0134158 | A1 | 5/2017 | Pasol et al. |
| 2017/0293913 | A1 | 10/2017 | Gulak et al. |
| 2018/0011996 | A1 | 1/2018 | Dolev et al. |
| 2018/0198601 | A1 | 7/2018 | Laine et al. |
| 2018/0278410 | A1 | 9/2018 | Hirano et al. |
| 2018/0375639 | A1 | 12/2018 | Lauter et al. |
| 2018/0375640 | A1 | 12/2018 | Laine et al. |
| 2019/0220734 | A1 | 7/2019 | Ferdman et al. |

OTHER PUBLICATIONS

Lopez-Alt, "Cryptographic Algorithms for the Secure Delegation of Multiparty Computation", https://www.cs.nyu.edu/media/publications/AdrianaLopezalt.pdf, May 2014, 120 pages.

Ozturk, "Accelerating Somewhat Homomorphic Evaluation using FPGAs", In Journal of IACR Cryptology ePrint Archive, Retrieved on: Oct. 18, 2016, Mar. 28, 2015, 15 pages.

Stehle, "Faster Fully Homomorphic Encryption", In Proceedings of International Conference on the Theory and Application of Cryptology and Information Security, Dec. 5, 2010, 25 pages.

Cetin, et al., "Arithmetic Using Word-wise Homomorphic Encryption", https://eprint.iacr.org/2015/1195.pdf, Retrieved on: Oct. 21, 2016, 15 pages.

Jaschke, et al., "Accelerating Homomorphic Computations on Rational Numbers", In Proceedings of International Conference on Applied Cryptography and Network Security, Jun. 19, 2016, 19 Pages.

Chase, et al., "Substring-Searchable Symmetric Encryption", In Proceedings on Privacy Enhancing Technologies, Jun. 18, 2015, 28 Pages.

Chen, et al., "Cocoon: Encrypted Substring Search", Retrieved From: https://pdfs.semanticscholar.org/ae2b/b2dd98ce5db50703005e3c6c7b43045621ca.pdf, May 11, 2016, 14 Pages.

Chen, et al., "Simple Encrypted Arithmetic Library—Seal v2.1", In Proceedings of International Conference on Financial Cryptography and Data Security, Nov. 19, 2017, 27 Pages.

Chung, et al., "Encoding Rational Numbers for FHE-based Applications", In Proceedings for International Association for Cryptologic Research, Mar. 30, 2016, 19 Pages.

Dowlin, et al., "Manual for Using Homomorphic Encryption for Bioinformatics", In Proceedings of the IEEE vol. 105, Issue 3, Mar. 2017, 18 Pages.

Fan, et al., "Somewhat Practical Fully Homomorphic Encryption", In Journal of IACR Cryptology ePrint Archive, Mar. 2012, 19 Pages.

Fouque, et al., "CryptoComputing with Rationals", In Proceedings of International Conference on Financial Cryptography, Mar. 11, 2002, 11 Pages.

Laine, Kim, "String Matching on Homomorphically Encrypted Data", Retrieved From: http://kimlaine.org/talks/IISc2017.pdf, Retrieved Date: Mar. 27, 2017, 28 Pages.

Lepoint, et al., "A Comparison of the Homomorphic Encryption Schemes FV and YASHE", In Proceedings of 7th International Conference on Cryptology in Africa, May 28, 2014, 18 Pages.

"International Search Report and Written Opinion Issued in PCT Application No. PCT/US2018/039571", dated Oct. 9, 2018, 13 Pages.

"International Search Report and Written Opinion Issued in PCT Application No. PCT/US2018/039634", dated Oct. 8, 2018, 13 Pages.

"Non Final Office Action Issued in U.S. Appl. No. 15/630,824", dated Jan. 7, 2019, 33 Pages.

"Non Final Office Action Issued in U.S. Appl. No. 15/633,284", dated Dec. 26, 2018, 23 Pages.

Brakerski, et al., "Efficient Fully Homomorphic Encryption from (Standard) LWE", In the Proceedings of 52nd Annual Symposium on Foundations of Computer Science, Oct. 22, 2011, pp. 97-106.

Chen, et al., "Fully Homomorphic Encryption Application in Cloud Computing", In the Proceedings of 11th International Computer Conference on Wavelet Active Media Technology and Information Processing, Dec. 19, 2014, pp. 471-474.

Wang, Yongge, "Octonion Algebra and Noise-Free Fully Homomorphic Encryption (FHE) Schemes", In the Journal of IACR Cryptology ePrint Archive, Jan. 25, 2016, 39 Pages.

Yong, et al., "A Novel Fully Homomorphic Encryption Scheme Bsed on LWE", In the Journal of Natural Sciences, Wuhan University, vol. 21, Issue 1, Feb. 1, 2016, pp. 84-92.

Zhang, et al., "Efficient Fully Homomorphic Encryption From RLWE with an Extension to a Threshold Encryption Scheme", In the Journal of Future Generation Computer Systems, vol. 36, Jul. 1, 2014, pp. 180-186.

"Non-Final Office Action Issued in U.S. Appl. No. 15/630,761", dated Mar. 22, 2019, 21 Pages.

"Final Rejection Issued in U.S. Appl. No. 15/633,284", dated Apr. 25, 2019, 25 Pages.

"Final Office Action Issued in U.S. Appl. No. 15/630,824", dated Jul. 18, 2019, 32 Pages.

"Final Office Action Issued in U.S. Appl. No. 15/630,761", dated Oct. 2, 2019, 20 Pages.

"Notice of Allowance Issued in U.S. Appl. No. 15/630,761", dated Jun. 10, 2020, 17 Pages.

"Non Final Office Action Issued in U.S. Appl. No. 15/630,824", dated May 20, 2020, 31 Pages.

\* cited by examiner

HIGH-PRECISION RATIONAL NUMBER ARITHMETIC IN HOMOMORPHIC ENCRYPTION

BACKGROUND

Cloud-based storage and on-line services are readily available and continue to develop rapidly. Enterprise customers, such as in the medical and financial sectors, save money and streamline business processes by outsourcing the storage and computation of their data to public storage, such as provided by cloud-based services. Instead of storing and managing a large amount of data locally, a medical service provider, for example, can utilize cloud storage for electronic medical records of patient data, and a financial service provider can utilize the cloud storage for financial data and customer records. However, using public cloud-based storage can potentially expose data, compromising the privacy and security of the personal medical, financial, and other sensitive data.

One effective technique is to store private and sensitive data in an encrypted form in the public cloud-based storage, and perform computations on the encrypted data directly. However, typical block ciphers do not allow encrypted data to be used in encrypted form, and meaningful computation on the encrypted data would either require it to be returned to the owner of the data for decryption, or alternatively, for the cloud-based storage service to have access to the decryption key. Homomorphic encryption refers to encryption schemes used to encrypt data in a way that allows evaluating Boolean or arithmetic circuits on the encrypted data while it remains encrypted. Homomorphic encryption may also refer to encryption schemes with less capabilities, such as for performing only additions or only multiplications on the encrypted data. However, the conventional techniques used to evaluate homomorphic encrypted data are significantly less efficient than operating on unencrypted data, such as if the data is returned to the owner of the data for decryption.

SUMMARY

This Summary introduces features and concepts of high-precision rational number arithmetic in homomorphic encryption, which is further described below in the Detailed Description and/or shown in the Figures. This Summary should not be considered to describe essential features of the claimed subject matter, nor used to determine or limit the scope of the claimed subject matter.

High-precision rational number arithmetic in homomorphic encryption is described. In aspects, a computing device stores homomorphic encrypted data as a dataset, and implements an encryption application that can encode integers into plaintext polynomials, where the integers are representative of initial data received for encryption. The encryption application can also encrypt the plaintext polynomials into ciphertexts of the homomorphic encrypted data. In aspects of the encryption, the encryption application encodes the integers into the plaintext polynomials and encrypts the plaintext polynomials into the ciphertexts as a combined process to generate the ciphertexts of the homomorphic encrypted data.

The encryption application can perform homomorphic operations as rational number arithmetic on the ciphertexts, such as multiplication operations, generating updated ciphertexts while the homomorphic encrypted data remains encrypted. The encryption application can then decrypt the updated ciphertexts to modified plaintext polynomials that can be resolved back to the plaintext polynomials effective to recover the integers that represent the initial data. The encryption application can also decode the modified plaintext polynomials back to the integers effective to recover the initial data in an unencrypted form. In aspects of the decryption, the encryption application decrypts the updated ciphertexts to the modified plaintext polynomials and decodes the modified plaintext polynomials as a combined process to recover the initial data in the unencrypted form.

In other aspects of high-precision rational number arithmetic in homomorphic encryption, the encryption application is implemented to encode the integers as the plaintext polynomials and encrypt the plaintext polynomials into the ciphertexts effective to allow homomorphic evaluation of large ciphertext polynomials on rational numbers. The encryption application is implemented to maximize a multiplicative depth of a homomorphic computation performed on the encrypted rational numbers. The homomorphic encrypted data is encrypted based on a Fan-Vercauteren (FV) homomorphic encryption scheme with the plaintext polynomials defined as $\mathbb{Z}/(b^n+1)\mathbb{Z}$ in an FVb encryption scheme, including having replaced coefficients reduced integer modulo t of the plaintext polynomials $\mathbb{Z}_t[x]/(x^n+1)$ in the FV plaintext space with (x−b).

The polynomials of the ciphertexts of the homomorphic encrypted data can be encrypted in log base two ($\log_2$) with coefficients of the encrypted polynomials being less than or equal to one. The encryption application replaces the t modulus of the plaintext polynomials $\mathbb{Z}_t[x]/(x^n+1)$ in the FV plaintext space with (x−b) effective to minimize t and allow homomorphic evaluation of large ciphertext polynomials on encrypted rational numbers. The encryption application is also implemented to perform multiplication operations on the ciphertexts as the homomorphic operations, where the ciphertexts of the homomorphic encrypted data are susceptible to a noise increase contributed by the multiplication operations on the ciphertexts. The encryption application can then optimize the noise increase in the ciphertexts contributed by the multiplication operations, effective to maximize a multiplicative depth of the homomorphic operations performed on the encrypted rational numbers. Replacing the t modulus of the plaintext polynomials with (x−b) allows for the optimization of the noise increase in the ciphertexts utilizing a large b value.

BRIEF DESCRIPTION OF THE DRAWINGS

Aspects of high-precision rational number arithmetic in homomorphic encryption are described with reference to the following Figures. The same numbers may be used throughout to reference like features and components that are shown in the Figures.

DETAILED DESCRIPTION

Aspects of high-precision rational number arithmetic in homomorphic encryption are described, such as to implement techniques for homomorphic operations, including multiplication operations and rational number arithmetic on homomorphic encrypted data. Generally, homomorphic encryption can be used to encrypt data in a way that allows computations to be performed on the encrypted data without decrypting it, such as evaluating Boolean or arithmetic circuits on the encrypted data while it remains encrypted. The techniques implement a variant of the Fan Vercauteren (FV) homomorphic encryption scheme, described herein as the FVb encryption scheme, which provides that significantly more efficient homomorphic operations, including rational number arithmetic, can be performed on encrypted rational numbers, which include input integers, of homomorphic encrypted data than allowable by the FV encryption scheme. Rational numbers can be encoded as elements in plaintext space, enabling homomorphic evaluation of deep circuits with high-precision rational number inputs. The FVb encryption scheme described herein allows an implemented encryption application to evaluate homomorphically very high polynomials on encrypted rational numbers.

The techniques for high-precision rational number arithmetic in homomorphic encryption can be implemented as optimizations to improve processing speed, such as for decrypting homomorphic encrypted data. The described techniques are implemented to perform homomorphic computations in $\mathbb{Z}[x]$ (integer coefficient polynomials) rather than in $\mathbb{Z}[x]/(x^n+1)$. A decryption result is an integer modulo $(B^n+1)$ where B is some small number. The modulo operation finds the remainder after division of one number by another. For example, given two positive numbers a and n, a modulo n is the remainder of the Euclidean division of a by n. When the computation is performed over $\mathbb{Z}[x]$, this number B is already reduced modulo $(B^n+1)$, and a small integer result is obtained. This provides for faster homomorphic operations, including rational number arithmetic, on homomorphic encrypted data, without needing to perform processing intensive reduction modulo the large number $(B^n+1)$.

While features and concepts of high-precision rational number arithmetic in homomorphic encryption can be implemented in any number of different devices, systems, networks, environments, and/or configurations, aspects of high-precision rational number arithmetic in homomorphic encryption are described in the context of the following example devices, systems, and methods.

Figure 1:
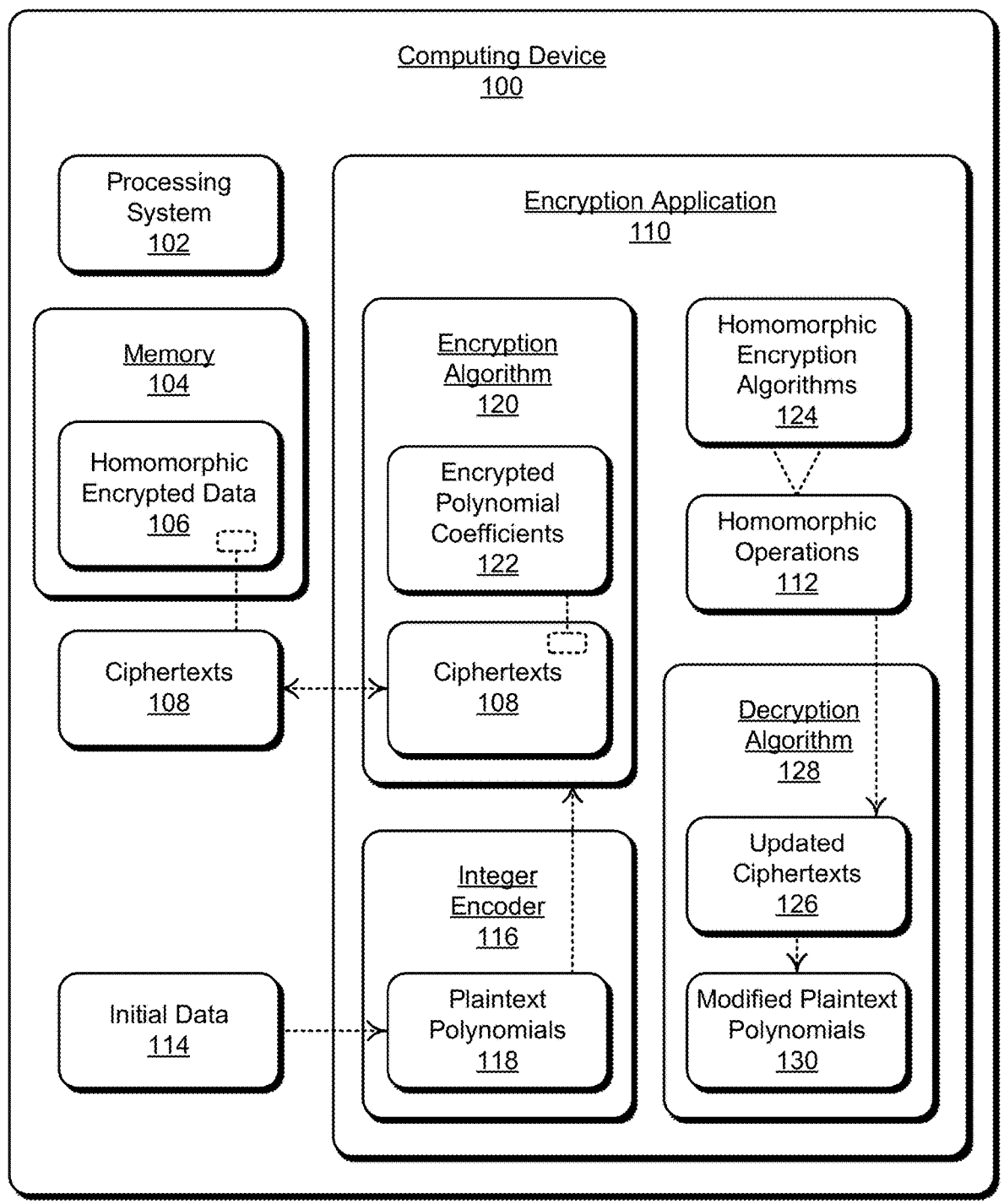
FIG. 1 illustrates an example computing device in which aspects of high-precision rational number arithmetic in homomorphic encryption can be implemented as described herein.

FIG. 1 illustrates an example computing device 100 in which aspects of high-precision rational number arithmetic in homomorphic encryption can be implemented. The computing device 100 can be implemented with various components, such as a processing system 102 and memory 104 (e.g., non-volatile, physical memory), and with any number and combination of different components as further described with reference to the example device shown in FIG. 5. In implementations, the processing system 102 may include multiple and/or different processors, such as a microprocessor, a separate graphics processor, and/or a separate high-speed, dedicated processor.

In this example, homomorphic encrypted data 106 is stored in the memory 104, such as a dataset of homomorphic encrypted data of ciphertexts 108. The homomorphic encrypted data 106 can include encrypted bit strings of some length in rows and columns, all of which are encrypted using homomorphic encryption to encrypt one bit of the data at a time. Homomorphic encryption is a powerful cryptographic technique that allows computation on the encrypted data 106 without first decrypting the encrypted data. Even though homomorphic operations can be performed on the encrypted data, the results of the operations remain encrypted, and no information about the underlying plaintext is accessible.

The computing device 100 implements an encryption application 110 that can include various algorithms to implement the techniques of high-precision rational number arithmetic in homomorphic encryption, as described herein. The application and algorithms can be implemented as software applications or modules, such as computer-executable software instructions that are executable with the processing system 102. The encryption application 110 can be stored in computer-readable storage memory (e.g., the memory 104), such as any suitable memory device or electronic data storage implemented in the computing device. Further, although the various algorithms are shown and described as modules of the encryption application 110, any one or combination of the algorithms may be implemented separately or together, and may be independent of the encryption application. An overview of the encryption application 110 and the various algorithms is described following, with additional implementation detail described with reference to FIG. 2.

Generally, the techniques and algorithms of high-precision rational number arithmetic in homomorphic encryption as described herein are agnostic to the homomorphic encryption scheme that is being used. However for simplicity, the discussion centers on Ring-LWE (Learning With Errors)-based cryptosystems. Fully homomorphic encryption refers to an encryption scheme which enables Boolean or arithmetic circuits to be evaluated on the encrypted data 106, without requiring access to the secret key used to encrypt the data. In RLWE-based homomorphic encryption schemes, the native plaintext elements are polynomials in a ring $\mathbb{Z}_t[x]/(x^n+1)$, where n is a power of two (2) and t is an integer modulus.

For performing rational number arithmetic, an encoding scheme is used, which converts the inputs to polynomials and allows the result of the homomorphic computation to be decoded to recover the result as a rational number. A problem is that the modulus t often needs to be extremely large to prevent the plaintext polynomial coefficients from being reduced modulo t during the computation, which is a requirement for the decoding operation to work correctly. This results in larger noise growth, and prevents the evaluation of deep circuits, unless the encryption parameters are significantly increased.

In aspects of high-precision rational number arithmetic in homomorphic encryption as implemented by the encryption application 110 described herein, the modulus t is replaced by a polynomial (x−b) in the Fan-Vercauteren (FV) encryption scheme. This yields a new encryption scheme, referred to herein as "FVb" with a convenient plaintext space $\mathbb{Z}/(b^n+1)\mathbb{Z}$. Rational numbers can be encoded as elements of this plaintext space, enabling homomorphic evaluation of deep circuits with high-precision rational number inputs. For example, the new FVb scheme allows the encryption application 110 to evaluate circuits of depth nine (9) with 32-bit integer inputs, whereas in the same parameter setting, the Fan-Vercauteren scheme only allows up to depth two (2).

Generally, the encryption schemes that are used for homomorphic encryption have several features in common. For example, security is based on the hardness of either the Learning With Errors (LWE) or the Ring Learning With Errors (RLWE) problem, which makes the plaintext and ciphertext spaces very similar in the different schemes. Another commonality is that in each homomorphic encryption scheme, every ciphertext 108 has an inherent attribute called noise, which accumulates in homomorphic operations 112, particularly when homomorphic multiplication operations are performed on the ciphertexts, and the accumulating noise corrupts the ciphertext once it reaches a certain maximum value. Once a ciphertext 108 is corrupted, it can no longer be decrypted, even with the correct secret key. Thus, an efficient solution is to increase the parameters of the encryption scheme, allowing deep enough circuits to be evaluated before the noise ceiling is reached. This approach is called a "leveled fully" homomorphic encryption scheme, as implemented by the encryption application 110.

In most homomorphic encryption schemes based on the Ring Learning With Errors (RLWE) assumption, the natural plaintext elements are polynomials in a ring $R_t = \mathbb{Z}_t[x]/\Phi_m(x)$, where $\Phi_m$ denotes the m-th cyclotomic polynomial. For security and performance, it is common to restrict m to be a power of two (2), in which case $\Phi_{2n}(x)$ is of the form $x^n+1$. Thus, homomorphic operations 112 performed on the ciphertexts 108 reflect on the plaintext side as additions and multiplications in the ring $R_t$. However, this is unnatural for nearly all naturally occurring applications, as in practice, operations are performed on encrypted integers and rational numbers. For this reason, an encoding of elements of $\mathbb{Z}$ or $\mathbb{Q}$ into polynomials in $R_t$ is utilized, which respects both additions and multiplications, and is also injective in a large domain (subset of $\mathbb{Z}$ or $\mathbb{Q}$), so that the results of a computation can be decoded after decryption.

Several different encoding methods for integers and rational numbers can be used, but all have a common limitation of the decoding operation will perform correctly only as long as the homomorphic operations 112 do not cause the underlying plaintext polynomial coefficients to be reduced modulo the integer t. In order for the result to be correct as an integer or as a rational number, t needs to be set sufficiently large. Therefore, when selecting encryption parameters for applications, considerations include making sure that the noise does not overflow, and also that the plaintext polynomial coefficients do not grow too large. This results in a subtle optimization problem, that in order to have no plaintext coefficient wrap-around, a large t is chosen, which unfortunately implies faster noise growth, and therefore larger parameters overall are chose for the encryption scheme to increase the noise ceiling and to preserve the security level. The consequence of this can be worse computational performance on the homomorphic encrypted data 106.

In aspects of high-precision rational number arithmetic in homomorphic encryption, the encryption application 110 is implemented to manage the plaintext polynomial coefficient growth by replacing the modulus t with a small polynomial (x−b), for some positive integer b (e.g., b=2), turning the plaintext space into the integer quotient ring $\mathbb{Z}/(b^n+1)\mathbb{Z}$. In typical parameter settings suitable for homomorphic encryption, n has size several thousands, yielding a plaintext space large enough to contain the results of many naturally occurring computations, without modular reduction ever taking place. The encryption application 110 is implemented to combine this method with the Fan-Vercauteren (FV) encryption scheme, which is also detailed in the Simple Encrypted Arithmetic Library (SEAL version of the library v2.1), which implements the Fan-Vercauteren scheme.

The techniques of high-precision rational number arithmetic in homomorphic encryption are described in the general context of encrypting, evaluating, and decrypting the homomorphic encrypted data 106. The encryption application 110 can receive initial data 114, and utilize an integer encoder 116 to encode integers that are representative of initial data 114 into plaintext polynomials 118. The encryption application 110 also implements an encryption algorithm 120 to encrypt the plaintext polynomials 118 into the ciphertexts 108 of the homomorphic encrypted data 106. In aspects of the encryption, the encryption application 110 encodes the integers of the initial data 114 into the plaintext polynomials 118 and encrypts the plaintext polynomials into the ciphertexts 108 as a combined process of the integer encoder 116 and the encryption algorithm 120 to generate the ciphertexts 108 of the homomorphic encrypted data.

The encryption application 110 is implemented to initiate the integer encoder 116 to encode the integers as the plaintext polynomials 118 defined as $\mathbb{Z}_t[x]/(x^n+1)$ with coefficients reduced integer modulo t. The encryption application 110 can also initiate the encryption algorithm 120 to encrypt the plaintext polynomials 118 into the ciphertexts 108, replacing the t modulus of the plaintext polynomials with (x−b) in the ciphertexts, and allowing homomorphic evaluation of large ciphertext polynomials on rational numbers. The homomorphic encrypted data 106 is encrypted based on the Fan-Vercauteren (FV) homomorphic encryption scheme with the plaintext polynomials defined as $\mathbb{Z}/(b^n+1)\mathbb{Z}$ in the FVb encryption scheme, including having replaced coefficients reduced integer modulo t of the plaintext polynomials $\mathbb{Z}_t[x]/(x^n+1)$ in the FV plaintext space with (x−b). Further, the polynomials of the ciphertexts 108 of the homomorphic encrypted data 106 can be encrypted in log base two ($\log_2$) with the coefficients 122 of the encrypted polynomials being less than or equal to one. The encryption application 110 replaces the t modulus of the plaintext polynomials $\mathbb{Z}_t[x]/(x^n+1)$ in the FV plaintext space with (x−b) effective to minimize t and allow homomorphic evaluation of large ciphertext polynomials on encrypted rational numbers (to include the input integers), as well as increase processing efficiency of the homomorphic encryption scheme.

The encryption application 110 can utilize or apply one or more of various homomorphic encryption algorithms 124 to perform the homomorphic operations 112, such as multiplication operations on the ciphertexts 108 of the homomorphic encrypted data 106, as well as rational number arithmetic on the ciphertexts. The homomorphic operations 112 generate updated ciphertexts 126 while the homomorphic encrypted data remains encrypted. As described herein, the ciphertexts 108 of the homomorphic encrypted data 106 are susceptible to a noise increase contributed by the multiplication operations on the ciphertexts. However, the noise increase in the FVb encryption scheme is optimized in the ciphertexts, effective to maximize a multiplicative depth of the homomorphic operations performed on encrypted rational numbers. The t modulus of the plaintext polynomials in the FV encryption scheme being replaced with (x−b) allows optimization of the noise increase in the ciphertexts utilizing a large b value.

The encryption application 110 can utilize a decryption algorithm 128 to then decrypt the updated ciphertexts 126 to modified plaintext polynomials 130 that can be resolved back to the plaintext polynomials 118 effective to recover the integers that represent the initial data 114. The decryption algorithm 128 can decode the modified plaintext polynomials 130 back to the integers effective to recover the initial data in an unencrypted form. In aspects of the decryption, the encryption application 110 decrypts the updated ciphertexts 126 to the modified plaintext polynomials 130 and decodes the modified plaintext polynomials as a combined process of the decryption algorithm 128 to recover the initial data 114 in the unencrypted form.

In aspects of high-precision rational number arithmetic in homomorphic encryption, the decryption algorithm 128 is implemented to perform the homomorphic computations in $\mathbb{Z}[x]$ (integer coefficient polynomials) rather than in $\mathbb{Z}[x]/(x^n+1)$. A decryption result is an integer modulo $(B^n+1)$ where B is some small number. The modulo operation finds the remainder after division of one number by another. For example, given two positive numbers a and n, a modulo n is the remainder of the Euclidean division of a by n. When the computation is performed over $\mathbb{Z}[x]$, this number B is already reduced modulo $(B^n+1)$, and a small integer result is obtained. This provides for faster decryption of the homomorphic encrypted data 106, without needing to perform processing intensive reduction modulo the large number $(B^n+1)$.

With reference to notation used herein, for n is a power of two (2), denote $R=\mathbb{Z}[x]/(x^n+1)$ as the 2n-th cyclotomic ring of integers. For an integer a, denote $R_a=R/aR=\mathbb{Z}_a[x]/(x^n+1)$ and $R^{\mathbb{Q}}=R\otimes\mathbb{Q}=\mathbb{Q}[x]/(x^n+1)$. Additionally, $p\in\mathbb{Z}[x]$ and the infinity norm of p is denoted $\|p\|$. For $p\in R$ (or $R_a$, $R^{\mathbb{Q}}$), consider the representative with the lowest possible degree, encounter the infinity norm in the canonical embedding, and for $p\in R$ (or $p\in R^{\mathbb{Q}}$), denote it by $\|p\|^{can}$. For integers modulo a, use representatives in the symmetric interval $[-\lceil(a-1)/2\rceil, \lfloor(a-1)/2\rfloor]$. For a polynomial $p\in\mathbb{Z}[x]$, $[p]_a$ denotes the coefficient-wise reduction modulo a. For $p\in\mathbb{Q}[x]$ denote rounding of the coefficients to the nearest integer by $\lfloor p\rceil$. For a polynomial p and an integer base w, denote the polynomials in its coefficient-wise base-w decomposition by $p^{(i)}$, where $i=0,\ldots,\lfloor\log_w\|p\|\rfloor$. Then denote by $\chi$ a discrete Gaussian distribution having standard deviation $\sigma$, truncated as some large bound B (e.g., $B\approx 6\sigma$). The computational security parameter is denoted $\lambda$, and "log" represents $\log_2$.

Fan-Vercauteren Scheme

With reference to the previous FV scheme, the plaintext space is the $R_t$, and the ciphertext space is the product ring $R_q\times R_q$, and assume $t\ll q$, which is the case for nearly all useful parameter choices. The degree n in the polynomial modulus $x^n+1$ is a power of two (2) (e.g., typically at least 1024). The standard deviation $\sigma$ of $\chi$ is often in practice chosen rather small, such as $\sigma\approx 3.19$. Denote $\Delta t=\lfloor q/t\rfloor$, so that $q=\Delta t+r_t(q)$ for some $r_t(q)<t$. Taking $w\geq 2$ as an integer (e.g., typically a power of two (2) for performance reasons), which is used for coefficient-wise base-w decompositions of polynomials, and denote $l=\lfloor\log_w q\rfloor$.

The security of the FV scheme is based on the hardness of the decisional RLWE problem of the homomorphic encryption schemes, and states essentially that given a fixed $s\leftarrow\chi$, the following two distributions are computationally indistinguishable: the distribution of pairs $(a, b=as+e)\in R_q\times R_q$, where $a\leftarrow R_q$, and $e\leftarrow\chi$, and the distribution of uniformly sampled pairs $(a, b)\leftarrow R_q\times R_q$. In practice, such as for performance and noise growth reasons, implementations use a "small secret" variant as an optimization and sample the coefficients of s from a narrow distribution (e.g., uniformly from $\{-1,0,1\}$. For a fixed $\sigma$, the security level $\lambda$ is determined mainly by n and q (for fixed n, smaller q means higher security), and can be estimated. The leveled fully homomorphic variant of the FV scheme includes the algorithms SecretKeyGen, PublicKeyGen, EvaluationKeyGen, Encrypt, Decrypt, Add, Multiply, and Relinearize as described below:

FV.SecretKeyGen: Sample $s\in R$ with coefficients uniform in $\{-1,0,1\}$.

Output $sk=s$.

FV.PublicKeyGen (sk): Set $s=sk$, sample $a\leftarrow R_q$, and $e\leftarrow\chi$.

Output $pk=([-(as+e)]_q, a)\in R_q\times R_q$.

FV.EvaluationKeyGen (sk, w): For $i=\{0,\ldots,l\}$, sample $a_i\leftarrow R_q$, $e_i\leftarrow\chi$.

Output the vector of pairs $evk=[([-(a_is+e_i)+w^is^2], a_i)\in R_q\times R_q : i=0,\ldots,l]$.

FV.Encrypt (pk, $m\in R_t$): Let $pk=(p_0, p_1)$, sample u with coefficients uniform in $\{-1,0,1\}$, and $e_0, e_1\leftarrow\chi$.

Output $ct=([\Delta m+p_0u+e_0]_q, [p_1u+e_1]_q)\in R_q\times R_q$.

FV.Decrypt (sk, ct): Set $s=sk$, $c_0=ct[0]$, and $c_0=ct[1]$.
Output $$\left[\left\lfloor\frac{t}{q}[c_0+c_1s]_q\right\rceil\right]_t \in R_t.$$

The correctness of the above public-key encryption scheme is known, and security follows from a simple indistinguishability argument, relying on the hardness of the decision-RLWE problem. For the homomorphic operations of Addition:

FV.Add $(ct_0, ct_1)$: Output $(ct_0[0]+ct_1[0], ct_0[1]+ct_1[1])\in R_q\times R_q$.

Multiplication is more complicated, an consists of two parts. The first part (FV.Multiply') forms an intermediate three-component ciphertext $ct'_{mult}$. Although a three-component ciphertext can be decrypted with an extension of the FV.Decrypt method described above, a key switching method can be implemented to reduce the size of a ciphertext back to two (2). Thus, the second part (FV.Relinearize) converts $ct'_{mult}$ to a final two-component output ciphertext $ct_{mult}$ using the evaluation key evk.

FV.Multiply' $(ct_0, ct_1)$: Denote $(c_0, c_1)=ct_0$ and $(d_0, d_1)=ct_1$. Compute $$c'_0 = \left[\left\lfloor\frac{t}{q}c_0d_0\right\rceil\right]_q$$

$$c'_1 = \left[\left\lfloor\frac{t}{q}(c_0d_1+c_1d_0)\right\rceil\right]_q$$

$$c'_2 = \left[\left\lfloor\frac{t}{q}c_1d_1\right\rceil\right]_q$$

and Output $ct_{mult}=(c_0',c_1',c_2',)\in R_q\times R_q\times R_q$.

FV.Relinearize (ct', evk): Denote $(c_0',c_1',c_2',)=ct'$. Express $c_2'$ in base w so that $c_2'=\Sigma_{i=1}^l {c'_2}^{(i)}w^i$ and set:

$$c_0 = c'_0 + \sum_{i=0}^l evk[i][0]{c''_2}^{(i)}$$

-continued $$c_1 = c_1' + \sum_{i=0}^{t} evk[i][1]c_2^{(i)}$$

and output $(c_0', c_1') \in R_q \times R_q$.

FV.Multiply (ct$_0$, ct$_1$, evk): Output
FV.Relinearize (FV.Multiply' (ct$_0$, ct$_1$), evk)$\in R_q \times R_q$.

Noise in FV

As noted above, every ciphertext in the FV encryption scheme has a noise component, which increases due to the homomorphic operations 112, particularly with multiplication operations on the ciphertexts. When using leveled fully homomorphic encryption schemes, the encryption application 110 is implemented to estimate the noise growth of the ciphertexts 108, which needs to be estimated as accurately as possible because only the party holding the secret key of the homomorphic encrypted data 106 can compute the exact value of the noise. The party performing the homomorphic evaluations must estimate the noise growth to ensure that the ciphertexts will not become corrupted. For the FV scheme, heuristic upper bounds can be estimated for the noise growth, yielding realistic noise growth estimates results when used for determining parameters in the leveled setting.

Generally, for the FV invariant noise, a definition of heuristic upper bounds are implemented for noise growth, which results in a simpler analysis and a more uniform growth pattern, making a performance analysis easier, as well as being usable with modulus switching. For a Definition) (the FV invariant noise), ct=(c$_0$, c$_1$) of an FV ciphertext that is the encrypted message m$\in R_t$. Its invariant noise v$\in R^\mathbb{Q}$ is the polynomial with the smallest infinity norm, such that:

$$\frac{t}{q}ct(s) = \frac{t}{q}(c_0 + c_1 s) = m + v + at \in R^\mathbb{Q} \text{ for some polynomial } a \in R.$$

Intuitively, Definition1 captures the notion that the noise v being rounded incorrectly is what causes decryption failures in the FV scheme, as noted in the following Lemma1, which bounds the coefficients of v. The proposition Lemma1: an FV ciphertext ct encrypting a message m decrypts correctly as long as the invariant noise v satisfies $\|v\| < \frac{1}{2}$. Given ct=(c$_0$, c$_1$) and using the formula for decryption, for some polynomial A:

$$m' = \left[\left\lfloor \frac{t}{q}[c_0 + c_1 s]_q \right\rceil\right]_t = \left[\left\lfloor \frac{t}{q}(c_0 + c_1 s) + At \right\rceil\right]_t = \left[\left\lfloor \frac{t}{q}(c_0 + c_1 s) \right\rceil\right]_t$$

By the definition of v, $m'=[\lfloor m+v+at \rceil]_t = m + \lfloor v \rceil$ (mod t), and decryption is successful as long as v is removed by the rounding (i.e., if $\|v\| < \frac{1}{2}$. The heuristics can be obtained using the infinity norm in the canonical embedding, called the canonical norm and denote $\|\cdot\|^{can}$, instead of the usual infinity norm. The canonical norm is useful due to the following facts.

In a proposition Lemma2: for any polynomials a, b$\in R^\mathbb{Q}$, $$\|a\| \leq \|a\|^{can} \leq \|a\|_1, \|ab\|^{can} \leq \|a\|^{can} \|b\|^{can}$$

If a$\in R^\mathbb{Q}$ has its coefficients sampled independently from a distribution with standard deviation $\sigma_{coeff}$, then $\|a\|^{can} \leq 6\sigma_{coeff}\sqrt{n}$, with very high probability. Since the usual infinity norm is always bounded from above by the canonical norm, it suffices to ensure for correctness that the canonical norm never reaches ½, and therefore in the heuristic estimates, all bounds are presented for the canonical norm of the noise.

The following Lemmas can easily be obtained from standard noise growth arguments for FV, combined with the proposition Lemma2 above. In a proposition Lemma3 (for FV initial noise heuristic), ct is a fresh FV encryption of a message m$\in R_t$. Given N$_m$ as an upper bound on the number of non-zero terms in the polynomial m, the noise v in ct satisfies:

$$\|v\|^{can} \leq \frac{r_t(q)}{q}\|m\|N_m + \frac{6\sigma t}{q}(4\sqrt{3n} + \sqrt{n})$$

with a very high probability.

In a proposition Lemma4 (for FV addition heuristic), ct$_1$ and ct$_2$ are two ciphertexts encrypting m$_1$, m$_2 \in R_t$, and have noises v$_1$, v$_2$, respectively. Then the noise v$_{add}$ in their sum ct$_{add}$ satisfies $\|v_{add}\|^{can} \leq \|v_1\|^{can} + \|v_2\|^{can}$. In a proposition Lemma5 (for FV multiplication heuristic), ct$_1$ is a ciphertext encrypting m$_1$ with noise v$_1$, and ct$_2$ is a ciphertext encrypting m$_2$ with noise v$_2$. Given N$_{1m}$ and N$_{m2}$ as upper bounds on the number of non-zero terms in the polynomials m$_1$ and m$_2$, respectively, then the noise v$_{mult}$ in the product ct$_{mult}$ satisfies the following bound:

$$\|v_{mult}\|^{can} \leq$$

$$\left(2\|m_1\|N_{m1} + 6tn + t\sqrt{3n}\right)\|v_2\|^{can} + \left(2\|m_2\|N_{m2} + 6tn + t\sqrt{3n}\right)\|v_1\|^{can} +$$

$$3\|v_1\|^{can}\|v_2\|^{can} + \frac{t\sqrt{3n}}{q} \cdot \frac{(12n)^{3/2} - 1}{\sqrt{12n} - 1} + \frac{6\sqrt{3t}}{q}n\sigma(l+1)w$$

with very high probability.

Of the five summands appearing in this formula, the first two are the most significant ones. The parameter w only affects the running time, so when that is not a concern, assume it to be small. This makes the last term small compared to the first two. Since $\|m_i\| \leq \frac{1}{2}$, and N$_{m_i} \leq n$, the following simple estimate:

$$\|v_{mult}\|^{can} \leq 14tn \max\{\|v_1\|^{can}, \|v_2\|^{can}\}$$

In this example implementation, considerations are restricted to a situation where the native SIMD functionality (batching) of the FV scheme is not used, in which case it is possible to choose the parameters so that r$_t$(q)=1. Furthermore, in practice $\|m\| << t/2$ when encoding integers or rational numbers using the encoders, which implies that the first term in the initial noise estimate of Lemma3 above is small, yielding the following simpler estimate:

$$\|v_{initial}\|^{can} \leq \frac{42\sigma tn}{q}$$

FVb Encryption Scheme

In implementations of high-precision rational number arithmetic in homomorphic encryption, a variant of an integer encoder is implemented by the encryption application 110. Given m$\in$M is a plaintext element, considered in the symmetric interval $[-\lceil b^n/2 \rceil, \lfloor b^n/2 \rfloor]$. When $b>2$, denote by $\hat{m}$ a polynomial whose coefficients are the symmetric representatives of the base-b digits of m. When b=2, the binary digits of m are used, but augmented with the repeating sign, which is the integer encoding discussed in the Simple Encrypted Arithmetic Library—SEAL (Technical report v2.1 Sep. 2016 to Player et al.), which implements the Fan-Vercauteren scheme.

In this scheme, only $b^n$ consecutive integers can be represented in such a way as polynomials of degree at most n−1, which leaves one plaintext integer without an obvious encoding. However, it suffices to allow the coefficients (in fact, at most one coefficient) in the encodings to have absolute value up to (b+1)/2. This gives more room to encode all elements of M, but also introduces non-uniqueness in the encodings. This is not a problem, however, as evaluating any such encoding at x=b yields the correct result modulo $b^n+1$. Further, every element of M has such an encoding of length at most n, with coefficients at most (b+1)/2. For example, when b=3 and n=2, a factor of −5 can be encoded as −x−2, and also as −2x+1. For definiteness, one such encoding per each element of M is fixed. For a Definition2, m∈M, and for each m∈M, a shortest polynomial is chosen with $\|\hat{m}\| \le (b+1)/2$, such that $\hat{m}(b)=m$ modulo $b^n+1$, and denote it $\hat{m}$. As described above, a polynomial always exists and has degree at most n+1.

New Leveled Scheme

With reference to the new leveled homomorphic encryption scheme implemented by the encryption application 110, let b≥2 be an integer and the new plaintext space is defined as $M=\mathbb{Z}/(b^n+1)\mathbb{Z}$. The parameters n, q, σ, w, l and the ring $R_q$ are as in the FV encryption scheme described above. The ciphertext space is the same as in FV, namely $R_q \times R_q$. Defined is:

$$\Delta_b = \left\lfloor -\frac{q}{b^n+1}(x^{n-1} + bx^{n-2} + \ldots + b^{n-1}) \right\rceil$$

which is analogous to Δ as described above.

The following set of algorithm describes the new leveled fully homomorphic encryption scheme.

SecretKeyGen: Output

*sk*=FV.SecretKeyGen.

PublicKeyGen (sk): Output

*pk*=FV.PublicKeyGen(*sk*)

EvaluationKeyGen (sk): Output

*evk*=FV.EvaluationKeyGen(*sk*)

Encrypt (pk, m∈M): Let pk=$(p_0, p_1)$, sample u with coefficients uniform in {−1,0,1}, and $e_0, e_1 \leftarrow \chi$. Let $\hat{m}$ be an encoding of m, as described above.

Output $ct=([\Delta\hat{m}+p_0u+e_0]_q, [p_1u+e_0]_q) \in R_q \times R_q$.

Decrypt (sk, ct): Set s=sk, $c_0$=ct[0], and $c_1$=ct[1]. Let $$\hat{M} = \left\lfloor \frac{x-b}{q}[c_0 + c_1 s]_q \right\rceil$$

and Output $m'=\hat{M}(b) \in M$

Output $$\left\lfloor \left\lfloor \frac{t}{q}[c_0 + c_1 s]_q \right\rceil \right\rfloor_t \in R_t.$$

The correctness of the above public-key encryption scheme is described below, and security follows from the same argument as for the FV scheme. For the new scheme, homomorphic operations of Addition is the same as for FV:

Add ($ct_0$, $ct_1$): Output FV.Add ($ct_0$, $ct_1$)

Multiplication again consists of two parts. The first part (Multiply') forms an intermediate three-component ciphertext $ct'_{mult}$ as in FV, which can be converted back to a ciphertext of size two (2) using FV.Relinearize with evk, to form the final two-component output ciphertext $ct_{mult}$.

Multiply' ($ct_0$, $ct_1$): Denote $(c_0, c_1)=ct_0$ and $(d_0, d_1)=ct_1$. Compute $$c'_0 = \left\lfloor \left\lfloor \frac{x-b}{q}c_0 d_0 \right\rceil \right\rfloor_q$$

$$c'_1 = \left\lfloor \left\lfloor \frac{x-b}{q}(c_0 d_1 + c_1 d_0) \right\rceil \right\rfloor_q$$

$$c'_2 = \left\lfloor \left\lfloor \frac{x-b}{q}c_1 d_1 \right\rceil \right\rfloor_q$$

and Output $ct'_{mult}=(c_0',c_1',c_2',)\in R_q \times R_q \times R_q$.

FV.Relinearize (ct', evk): Output FV.Relinearize (ct', evk)
Multiply ($ct_0$, $ct_1$, evk): Output Relinearize (Multiply'($ct_0,ct_1$))∈$R_q \times R_q$.

With reference to the correctness of the public-key encryption scheme a variant of Definition1 is Definition3 (for invariant noise), given ct=$(c_0, c_1)$ is a ciphertext that is the encrypted message m∈M. Its invariant noise v∈$R^\mathbb{Q}$ is the polynomial with the smallest infinity norm, such that:

$$\frac{x-b}{q}ct(s) = \frac{x-b}{q}(c_0+c_1s) = \hat{m} + v + a(x-b) \in R^\mathbb{Q}$$

for some polynomial a∈R.

With reference to the conditions for decryption, a proposition Lemm6: the function Decrypt, as indicated above, correctly decrypts a ciphertext ct encrypting a message m, as long as the invariant noise v satisfies $\|v\|<\frac{1}{2}$. Given ct=$(c_0, c_1)$ and using the formula for decryption, for some polynomial A:

$$\hat{M} = \left\lfloor \frac{x-b}{q}[c_0+c_1s]_q \right\rceil$$

$$= \left\lfloor \frac{x-b}{q}(c_0+c_1s+Aq) \right\rceil$$

$$= \lfloor \hat{m} + v + a(x-b) \rceil + A(x-b)$$

$$= \hat{m} + \lfloor v \rceil + (A+a)(x-b)$$

and decryption is successful as long as v is removed by the rounding (i.e., if $\|v\|<\frac{1}{2}$, Decrypt outputs $m'=\hat{M}(b)=\hat{m}(b)=m\in M$.

The noise in a fresh encryption is small enough for correct decryptions. To this end, recall the definition of $\Delta b$, and prove the following analogue of $q=\Delta t+rt(q)$ in a proposition Lemma7 with:

$$\Delta_b = \left\lfloor -\frac{q}{b^n+1}(x^{n-1} + bx^{n-2} + \cdots + b^{n-1})\right\rceil,$$

$$\Delta_b(x-b) = q + \rho \in R^Q, \text{ and } \|\rho\| \le (b+1)/2.$$

The proof is a straightforward computation, for some polynomial $\in$, with $\|\in\|\le\frac{1}{2}$, then:

$$\Delta_b(x-b) = -\frac{q}{b^n+1}(x-b)(x^{n-1} + bx^{n-2} + \cdots + b^{n-1}) + \epsilon(x-b)$$

$$= -\frac{q}{b^n+1}(x^n - b^n) + \epsilon(x-b)$$

$$= \frac{q}{b^n+1}(b^n + 1 - (x^n + 1)) + \epsilon(x-b)$$

$$= q + \epsilon(x-b) - \frac{q}{b^n+1}(x^n+1)$$

Thus, $\Delta_b(x-b)=q+\rho\in R^{\mathbb{Q}}$, where $\rho=\in(x-b)$, and the bound $\|\rho\|\le(b+1)/2$ is clear.

For a proposition Lemma8 (for initial noise), $ct=(c_0, c_1)$ is a fresh encryption of a message $m\in M$. Let $N_m$ denote an upper bound on the number of non-zero coefficients in $\hat{m}$ and the noise $v$ in $ct$ satisfies the bound:

$$\|v\| \le \frac{1}{q}\left(\frac{b+1}{2}\right)^2 N_m + \frac{b+1}{q}B(2n+1)$$

The proof is to let $ct=(c_0, c_1)$ is a fresh encryption of m under the public key $pk=(p_0, p_1)=([-(as+e)]_q, a)$. Then, for some polynomials $k_0, k_1, k$, $$\frac{x-b}{q}(c_0 + c_1 s) = \frac{x-b}{q}(\Delta_b \hat{m} + p_0 u + e_0 + k_0 q + p_1 us + e_1 s + k_1 qs)$$

$$= \hat{m} + \frac{\rho\hat{m}}{q} + \frac{x-b}{q}(p_0 u + e_0 + p_1 us + e_1 s) +$$

$$(x-b)(k_0 + k_1 s)$$

$$= \hat{m} + \frac{\rho\hat{m}}{q} +$$

$$\frac{x-b}{q}((-as - e + kq)u + e_0 + aus + e_1 s) +$$

$$(x-b)(k_0 + k_1 s)$$

$$= \hat{m} + \frac{\rho\hat{m}}{q} + \frac{x-b}{q}(-eu + e_1 + e_2 s) +$$

$$(x-b)(k_0 + k_1 s + ku)$$

where the noise is:

$$\|v\| = \frac{\rho\hat{m}}{q} + \frac{x-b}{q}(-eu + e_1 + e_2 s)$$

To bound $\|v\|$, use Lemma7 in that the error polynomials sampled from $\chi$ have coefficients bounded by B, and that $\|s\|=\|u\|=1$:

$$\|v\| \le \frac{1}{q}\left(\frac{b+1}{2}\right)^2 N_m + \frac{b+1}{q}B(2n+1)$$

Noting that $N_m \le n$ in any case. The propositions Lemma6 and Lemma8 can be combined for the public-key encryption scheme. In a Theorem1, the public-key encryption scheme defined by the algorithms SecretKeyGen, PublicKeyGen, Encrypt, and Decrypt, is correct as long as the parameters are chosen so that:

$$\frac{1}{q}\left(\frac{b+1}{2}\right)^2 n + \frac{b+1}{q}B(2n+1) < \frac{1}{2}$$

With reference to security, the security argument for the new scheme is exactly the same as for the FV scheme. Namely, the public key is indistinguishable from uniform due to the decision-RLWE assumption. Ciphertexts are indistinguishable from uniform due to a two-layered decision-RLWE assumption, where the uniformity of the public key is used together with the decision-RLWE assumption to hide the message. Thus, one can prove that the scheme is secure if the 2-sample (small-secret) decision-RLWE problem is hard. The evaluation key does introduce a standard circular security assumption.

Homomorphic Operations

In implementations of high-precision rational number arithmetic in homomorphic encryption, the encryption application 110 can perform homomorphic addition and multiplication, and the noise growth bounds for the new FVb scheme are described below, along with heuristic noise growth estimates. With reference to addition, given $ct_1$ is a ciphertext encrypting $m_1$, and $ct_2$ is a ciphertext encrypting $m_2$, recall Definition2 above that the messages $m_1$ and $m_2$ can be encoded as polynomials $\|\hat{m_1}\|$ and $\|\hat{m_2}\|$ of degree at most $n-1$, where $\|\hat{m_1}\|$, $\|\hat{m_2}\|\le(b+1)/2$. The output $ct_{add}$=Add $(ct_1, ct_2)$ of a homomorphic addition is supposed to encrypt the sum of the underlying plaintexts, $m_1+m_2\in M$, as long as $ct_{add}$ has noise less than $\frac{1}{2}$.

As a proof, replace the sum of the encodings $\hat{m_1}$ and $\hat{m_2}$ with $\widehat{m_1+m_2}$. These are not too different, in that $(\hat{m_1} + \hat{m_2} - \widehat{m_1+m_2})(b)=0 \mod (b^n+1)$, which means that R (i.e., modulo $x^n+1$) can be expressed as $(\hat{m_1} + \hat{m_2} - \widehat{m_1+m_2})(b)=a(x-b)$, for some integer-coefficient polynomial a. As a proposition Lemma9, given $ct_1$ and $ct_2$ are two ciphertexts encrypting $m_1, m_2\in M$, and having noises $v_1, v_2$, respectively. Then $ct_{add}$=Add$(ct_1, ct_2)$ encrypts the sum $m_1+m_2\in M$, and has noise $v_{add}$, such that $\|v_{add}\|\le\|v_1\|+\|v_2\|$. As a proof according to Definition3, expressions:

$$\frac{x-b}{q}ct_1(s) = \hat{m_1} + v_1 + a_1(x-b),$$

$$\frac{x-b}{q}ct_2(s) = \hat{m_2} + v_2 + a_2(x-b),$$

for some integer-coefficient polynomials $a_1, a_2$. It then follows from the definition of Add, that $$\frac{x-b}{q} ct_{add}(s) =$$

$$\frac{x-b}{q} ct_1(s) + \frac{x-b}{q} ct_2(s) = \widehat{m_1} + \widehat{m_2} + v_1 + v_2 + (a_1 + a_2)(x-b) =$$

$$\widehat{m_1 + m_2} + v_1 + v_2 + (a_1 + a_2 + a)(x-b)$$

Therefore, $ct_{add}$ indeed encrypts the sum $m_1+m_2$, and has noise $v_{add}=v_1+v_2$, as well as $\|v_{add}\|=\|v_1+v_2\| \leq \|v_1\|+\|v_2\|$.

With reference to multiplication, recalling that homomorphic multiplication (Multiply) consists of two steps: the first step (Multiply') outputs an intermediate three-component ciphertext, and the second step (Relinearize) changes it back to size two (2). The output $ct_{mult}$=Multiply ($ct_1$, $ct_2$, evk) of a homomorphic multiplication is supposed to encrypt the product of the underlying plaintexts, $m_1 m_2 \in M$, as long as $ct_{mult}$ has noise less than ½. Just like in Lemma9, in the following proof, replace the product of the encodings $\widehat{m_1}$ and $\widehat{m_2}$ with $\widehat{m_1 m_2}$. Again, these are not too different in that $(\widehat{m_1} \widehat{m_2} - \widehat{m_1 m_2})(b)=0 \mod (b^n+1)$, which means that R (i.e., modulo $x^n+1$) can be expressed as $(\widehat{m_1} \widehat{m_2} - \widehat{m_1 m_2})=a(x-b)$, for some integer-coefficient polynomial a. As a proposition Lemma10, given $ct_1$ and $ct_2$ are two ciphertexts encrypting $m_1, m_2 \in M$, and having noises $v_1, v_2$, respectively. Let $N_{m1}$ and $N_{m2}$ be upper bounds on the number of non-zero terms in the polynomials $\widehat{m_1}$ and $\widehat{m_2}$, respectively. Then $ct_{mult}$=Multiply ($ct_1$, $ct_2$, evk) encrypts the product $m_1 m_2 \in M$, and has noise $v_{mult}$, such that:

$$\|v_{mult}\| \leq \frac{b+1}{2}(N_{m1} + n^2 + 2n)\|v_2\| + \frac{b+1}{2}(N_{m2} + n^2 + 2n)\|v_1\| +$$

$$3n\|v_1\|\|v_2\| + \frac{(b+1)B}{q}(1 + n + n^2) + \frac{(b+1)}{q} nB(\ell+1)w$$

With reference to heuristic estimates, heuristic upper bounds for the noise growth are discussed, just like for FV. Again, the canonical norm wan $\|\cdot\|^{can}$ is used instead of the usual infinity norm $\|\cdot\|$ for the same reasons as above, in that essentially, it allows to prove more accurate heuristic estimates for the noise growth in multiplication. The results are simple modifications of the proofs of Lemma8, Lemma9, and Lemma10 combined with Lemma2, as described above. For a proposition Lemma11 (for initial noise heuristic), ct is a fresh encryption of a message $m \in M$. Let $N_m$ denote an upper bound on the number of non-zero coefficients in $\hat{m}$ and the noise v in ct satisfies the bound:

$$\|v\|^{can} \leq \frac{1}{q}\left(\frac{b+1}{2}\right)^2 2\sqrt{3n}\, N_m + \frac{6\sigma(b+1)}{q}\left(4\sqrt{3n} + \sqrt{n}\right)$$

with very high probability.

As a proposition Lemma12 (for addition heuristic), given $ct_1$ and $ct_2$ are two ciphertexts encrypting $m_1, m_2 \in M$, and having noises $v_1, v_2$, respectively. Then $ct_{add}$=Add ($ct_1$, $ct_2$) encrypts the sum $m_1+m_2 \in M$, and has noise $v_{add}$, such that $\|v_{add}\|^{can} \leq \|v_1\|^{can} + \|v_2\|^{can}$. As a proposition Lemma13 (for multiplication heuristic), given $ct_1$ and $ct_2$ are two ciphertexts encrypting $m_1, m_2 \in M$, and having noises $v_1, v_2$, respectively. Then $N_{m1}$ and $N_{m2}$ be upper bounds on the number of non-zero terms in the polynomials $\widehat{m_1}$ and $\widehat{m_2}$, respectively, and $ct_{mult}$=Multiply ($ct_1$, $ct_2$, evk) encrypts the product $m_1 m_1 \in M$, and has noise $v_{mult}$, such that:

$$\|v_{mult}\|^{can} \leq (b+1)(N_{m1} + 6n + \sqrt{3n})\|v_2\|^{can} +$$

$$(b+1)(N_{m2} + 6n + \sqrt{3n})\|v_1\|^{can} + 3n\|v_1\|^{can}\|v_2\|^{can} +$$

$$\frac{(b+1)}{q}\sqrt{3n}\left(1 + \sqrt{12n} + 12n\right) + \frac{6\sqrt{3}(b+1)}{q} n\sigma(\ell+1)w$$

with very high probability.

Of the five summands appearing in this formula, the first two are again the most significant ones. As before, the parameter w only affects the running time, so when that is not a concern, assume it to be small. This makes the last term small compared to the first two. Since $N_{m_1} \leq n$, the following simple estimate:

$$\|v_{mult}\|^{can} \leq 14(b+1)n \max\{\|v_1\|^{can}, \|v_2\|^{can}\}$$

For the initial noise, again use $N_m \leq n$ to obtain:

$$\|v_{initial}\|^{can} \leq \frac{(b+1)^2 n^{3/2}}{q}$$

Fractional Encoder

A fractional encoder is a convenient way of encoding and encrypting fixed-precision rational numbers, and can be used in conjunction with many RLWE-based homomorphic encryption schemes, as described in a document "Manual for using homomorphic encryption for bioinformatics" by Dowlin et al. (Proceedings of the IEEE, 105(3):552-567, 2017).

An Abstract Fractional Encoder is implemented by the encryption application 110 for use with the new FVb scheme. The abstract fraction encoder can be used for any homomorphic encryption scheme whose plaintext space is a ring M, and can abstract out the functionality of encoding fractional numbers as a triple (P, Encode, Decode), where P is a finite subset of $\mathbb{Q}$, and Encode: $P \to M$, Decode: Encode $(P) \to P$ are maps satisfying Decode (Encode (x))=x, for all $x \in P$. To preserve the homomorphic property, additionally require that when x, y, x+y, xy $\in P$, then Encode$(x+y)$=Encode$(x)$+Encode$(y)$, Encode$(xy)$=Encode$(x)$Encode$(y)$ In this case $M = \mathbb{Z}/(b^n+1)\mathbb{Z}$, so a natural candidate for a fractional encoding map that satisfies the homomorphic properties would be:

Encode: $P \to M$, $$\text{Encode}\left(\frac{x}{y}\right) = xy^{-1} \mod (b^n + 1).$$

However, P is chosen carefully to make this map both well-defined and injective. For example, it is clearly undefined when gcd(y, $b^n$+1)>1, which these issues are resolved below, presenting appropriate choices for P.

Case of Odd b

When b is odd, can prove that $$P = \left\{c + \frac{d}{b^{n/2}} : c, d \in \left[-\frac{b^{\frac{n}{2}}-1}{2}, \frac{b^{n/2}-1}{2}\right] \cap \mathbb{Z}\right\}$$

which makes the map Encode presented above well-defined and injective, and thus invertible in its range. For a proposition Lemma14, the map Encode: P→M is injective. For example, given $c+d/b^{n/2}=c'+d'/b^{n/2}$ mod($b^n+1$), then $(c-c')b^{n/2}+(d-d')=k(b^n+1)$ for some integer k. However, have:

$$(c-c')b^{n/2}(d-d') \le (b^{n/2}-1)b^{n/2}+(b^{n/2}-1)=b^n-1<b^n+1$$

Thus k=0, and $cb^{n/2}+d=c'b^{n/2}+d'$. Dividing both sides by $b^{n/2}$ proves the claim.

The Decode is defined as the left inverse of Encode in its range, and a simple description for Decode is derived below. As usual, $[y]_a$ denotes reduction of the integer y modulo a in the symmetric interval $[-\lceil(a-1)/2\rceil, \lfloor(a-1)/2\rfloor]$. For a proposition Lemma15, for z∈Encode(P), have:

$$\text{Decode}(z) = \frac{[zb^{n/2}]_{b^n+1}}{b^{n/2}}$$

As the proof, assume z=Encode(y), with $y=c+d/b^{n/2}$ and by definition of Encode, then $zb^{n/2}=yb^{n/2}=cb^{n/2}+d$ mod($b^n+1$). It follows from the definition of P, that $|cb^{n/2}+d|\le(b^n-1)/2$. Hence $[zb^{n/2}]_{b^n+1}=cb^{n/2}+d$, and dividing both sides by $b^{n/2}$ yields the result.

Case of Even b

When b is even, can encode fractions with n/2 integral base-b digits, and n/2 fractional base-b digits. When b is even, due to technical constraints, need to reduce either the number of fractional digits or the number of integral digits by one. Given to reduce the number of fractional digits by one, set $$P = \left\{c + \frac{d}{b^{n/2-1}} : |c| \le \frac{(b^{n/2}-1)b}{2(b-1)}, |d| \le \frac{(b^{n/2-1}-1)b}{2(b-1)}, c, d \in \mathbb{Z}\right\}$$

This makes the map Encode presented above well-defined and injective, and thus invertible in its range. For a proposition Lemma16, the map Encode: P→M is injective. For example, given $c+d/b^{n/2-1}=c'+d'/b^{n/2-1}$ mod($b^n+1$), then $(c-c')b^{n/2-1}+(d-d')=k(b^n+1)$ for some integer k. However, have:

$$(c-c')b^{n/2-1}+(d-d') \le \frac{b}{b-1}[(b^{n/2}-1)b^{n/2-1}+b^{n/2-1}-1] =$$

$$\frac{b}{b-1}(b^{n-1}-1) \le b^n-b < b^n+1$$

Thus k=0, and $cb^{n/2-1}+d=c'b^{n/2-1}+d'$. Dividing both sides by $b^{n/2-1}$ proves the claim.

The Decode is derived as a simple expression in a proposition Lemma17, for z∈Encode(P), have:

$$\text{Decode}(z) = \frac{[zb^{n/2-1}]_{b^n+1}}{b^{n/2-1}}$$

As the proof, assume z=Encode(y), with $y=c+d/b^{n/2-1}$ and by definition of Encode, then $zb^{n/2-1}=yb^{n/2-1}=cb^{n/2-1}+d$ mod($b^n+1$). It follows from the definition of P, that:

$$|cb^{n/2-1}+d| \le \frac{b^n-b}{2(b-1)} < \frac{b^n+1}{2}$$

Hence $[zb^{n/2-1}]_{b^n+1}=Cb^{n/2-1}+d$, and dividing both sides by $b^{n/2-1}$ yields the result.

As an example, let n=8, b=10, and y=12.55. Since $100^{-1}=-10^6$ mod $(10^8+1)$, $z=\text{Encode}(y)=[-1255\cdot 10^6]_{10^8+1}=45000013$. For the purposes of encryption, also need to compute the polynomial encoding $\hat{z}=-5x^7-5x^6+x+2$. Decryption evaluates this polynomial (or, more correctly, a polynomial equal to it modulo x−10) at x=10. Of course, this gives back the number 45000013 mod $(10^8+1)$, which decoding converts to $$\text{Decode}(z) = \frac{[45000013 \cdot 10^3]_{10^8+1}}{10^3} = 12.55$$

FVb Performance Comparison

A performance of the new FVb encryption scheme as described herein can be compared to the FV scheme to illustrate the performance improvements and other aspects of the FVb scheme. A computational evaluation of a regular circuit is parameterized by three integers A, D, and L, and involves evaluating A-levels of additions, followed by one level of multiplication, iterated D times. The inputs to the circuit are integers in the interval $[-L, L]$, and the circuit has a multiplicative depth D. For comparison of the FV and new FVb schemes, consider $A_{\in\{0,3,10\}}$, with inputs of size $L_{\in\{2^8,2^{16},2^{32},2^{64},2^{128}\}}$, and evaluating to determine the largest possible D.

Since the FV scheme does not natively encrypt integers, an NAF encoder can be used. The main challenge with using the FV scheme is the plaintext polynomial coefficient growth, which quickly forces a very large t to be used, causing faster noise growth, and subsequently restricting the depth of the circuits. In the settings that are considered, the plaintext polynomial space is not close to being filled-up to the top coefficient, and since the only advantage of using a higher base in the encoding process is that the encodings are shorter, there is no loss in restricting to the NAF encoder.

The security of FV and the new FVb scheme are based on exactly the same parameters, and therefore it suffices to fix σ and settle on a set of pairs (n, q) with desired security properties. For all parameters, σ=3.19 and the pairs (n, q) are as below in Table 1:

TABLE 1

| Parameters (n, q) | | | | | |
|---|---|---|---|---|---|
| n | 2048 | 4096 | 8192 | 16384 | 32768 |
| q | $2^{60} - 2^{14} + 1$ | $2^{116} - 2^{18} + 1$ | $2^{226} - 2^{26} + 1$ | $2^{435} - 2^{33} + 1$ | $\approx 2^{890}$ |

The heuristic upper bound estimates for noise growth are used for the FV scheme and the new FVb scheme to find optimal tuples (t, D) for FV and the tuples (b, D) for the new FVb scheme, such that such that the depth D of the regular circuit is maximized, while ensuring correctness. The inequalities imposed by these constraints for both schemes is discussed following.

For the FV scheme, the noise is bound after the evaluation of a regular circuit with parameters A and D by (approximately):

$$(14tn2^A)^D \frac{42\sigma tn}{q}$$

For correctness, this is less than ½, which gives the heuristic depth estimate:

$$D \lesssim \left\lfloor \frac{\log q - \log(84\sigma tn)}{\log(14tn) + A} \right\rfloor$$

The coefficient growth is bound in the plaintext polynomials, and the length of the NAF encoding of integers of absolute value up to L is bounded by $\lfloor \log L \rfloor + 2$, of which at most $d = \lceil (\lfloor \log L \rfloor + 2)/2 \rceil$ are non-zero. For correct decoding, this proves the need for the coefficient growth condition:

$$\sqrt{\frac{6}{\pi 2^D d 9d + 2)}} (d+1)^{2^D} 2^{A(2^{D+1}-2)} < t/2$$

The plaintext polynomial does not wrap around $x^n+1$, which would result in the condition of $(\lfloor \log L \rfloor + 2) \cdot 2^D \leq n-1$ (however, this bound has no effect). It therefore suffices to search for a t, that yields a maximum depth D, satisfying only the coefficient growth condition (equation above), and the noise condition. The results are indicated below in Table 2:

For the new FVb scheme, the noise is bound after the evaluation of a regular circuit with parameters A and D by (approximately):

$$(14(b+1)n2^A)^D \frac{(b+1)^2 n^{3/2}}{q}$$

For correctness, this is less than ½, which gives the heuristic depth estimate:

$$D \lesssim \left\lfloor \frac{\log q - \log(2(b+1)^2 n^{3/2})}{\log(14(b+1)n) + A} \right\rfloor$$

There is a restriction from the plaintext wrapping around $b^n+1$. The output of the regular circuit has absolute value bounded by $V = L^{2^D} 2^{A(2^{D+1}-2)}$, and for correctness $V \leq (b^n-1)/2$, which yields:

$$D \lesssim \left\lfloor \log\left(\frac{\log((b^n-1)2^{2A-1})}{\log(2^{2A}L)}\right) \right\rfloor \approx \left\lfloor \log\left(\frac{n \log b + 2A - 1}{2A + \log L}\right) \right\rfloor$$

Combining this with the noise condition yields, for a fixed b, the overall bound:

TABLE 2

Allowed maximum depth for FV with NAF encoding, with $2^A$ additions at each level, for $A \in \{0, 3, 10\}$, and several input sizes $L \in \{2^8, 2^{16}, 2^{32}, 2^{64}, 2^{128}\}$.

| | | A = 0 | | | | | | | | | |
|---|---|---|---|---|---|---|---|---|---|---|---|
| | | L = $2^8$ | | L = $2^{16}$ | | L = $2^{32}$ | | L = $2^{64}$ | | L = $2^{128}$ | |
| n | log q | log t | max D | log t | max D | log t | max D | log t | max D | log t | max D |
| 2048 | 60 | 4 | 1 | 5 | 1 | 6 | 1 | 7 | 1 | 8 | 1 |
| 4096 | 116 | 9 | 2 | 11 | 2 | 13 | 2 | 16 | 2 | 19 | 2 |
| 8192 | 226 | 19 | 3 | 24 | 3 | 30 | 3 | 36 | 3 | 19 | 2 |
| 16384 | 435 | 39 | 4 | 50 | 4 | 63 | 4 | 36 | 3 | 43 | 3 |
| 32768 | 890 | 80 | 5 | 102 | 5 | 63 | 4 | 76 | 4 | 91 | 4 |

| | | A = 3 | | | | | | | | | |
|---|---|---|---|---|---|---|---|---|---|---|---|
| | | L = $2^8$ | | L = $2^{16}$ | | L = $2^{32}$ | | L = $2^{64}$ | | L = $2^{128}$ | |
| n | log q | log t | max D | log t | max D | log t | max D | log t | max D | log t | max D |
| 2048 | 60 | 10 | 1 | 11 | 1 | 12 | 1 | 13 | 1 | . . . | 0 |
| 4096 | 116 | 10 | 1 | 11 | 1 | 12 | 1 | 13 | 1 | 14 | 1 |
| 8192 | 226 | 27 | 2 | 29 | 2 | 31 | 2 | 34 | 2 | 37 | 2 |
| 16384 | 435 | 61 | 3 | 66 | 3 | 72 | 3 | 78 | 3 | 85 | 3 |
| 32768 | 890 | 129 | 4 | 140 | 4 | 153 | 4 | 78 | 3 | 85 | 3 |

| | | A = 10 | | | | | | | | | |
|---|---|---|---|---|---|---|---|---|---|---|---|
| | | L = $2^8$ | | L = $2^{16}$ | | L = $2^{32}$ | | L = $2^{64}$ | | L = $2^{128}$ | |
| n | log q | log t | max D | log t | max D | log t | max D | log t | max D | log t | max D |
| 2048 | 60 | . . . | 0 | . . . | 0 | . . . | 0 | . . . | 0 | . . . | 0 |
| 4096 | 116 | 24 | 1 | 25 | 1 | 26 | 1 | 27 | 1 | 28 | 1 |
| 8192 | 226 | 24 | 1 | 25 | 1 | 26 | 1 | 27 | 1 | 28 | 1 |
| 16384 | 435 | 69 | 2 | 71 | 2 | 73 | 2 | 76 | 2 | 79 | 2 |
| 32768 | 890 | 159 | 3 | 164 | 3 | 170 | 3 | 176 | 3 | 183 | 3 |

$$D \lesssim \min\left\{\left\lfloor \log\left(\frac{n\log b + 2A - 1}{2A + \log L}\right)\right\rfloor, \left\lfloor \frac{\log q - \log(2(b+1)^2 n^{3/2})}{\log(14(b+1)n) + A}\right\rfloor\right\}$$

The results for maximizing D are indicated below in Table 3 below, where the largest parameters illustrate how the size of the integers quickly become the main bottleneck in the new scheme, and demands the use of extremely large values for b.

TABLE 3

Allowed maximum depth for the new FVb scheme, with $2^A$ additions at each level, for $A_{\in\{0, 3, 10\}}$, and several input sizes $L_{\in\{2^8, 2^{16}, 2^{32}, 2^{64}, 2^{128}\}}$.

| | | \multicolumn{10}{c|}{A = 0} |
|---|---|---|---|---|---|---|---|---|---|---|---|
| | | $L = 2^8$ | | $L = 2^{16}$ | | $L = 2^{32}$ | | $L = 2^{64}$ | | $L = 2^{128}$ | |
| n | log q | b | max D | b | max D | b | max D | b | max D | b | max D |
| 2048 | 60 | 2 | 2 | 2 | 2 | 2 | 2 | 2 | 2 | 2 | 2 |
| 4096 | 116 | 2 | 5 | 2 | 5 | 2 | 5 | 2 | 5 | 3 | 5 |
| 8192 | 226 | 3 | 10 | 5 | 10 | 5 | 9 | 17 | 9 | 17 | 8 |
| 16384 | 435 | 257 | 14 | 257 | 13 | 257 | 12 | 257 | 11 | 65539 | 11 |
| 32768 | 890 | $\approx 2^{16}$ | 16 | $\approx 2^{16}$ | 15 | $\approx 2^{32}$ | 15 | $\approx 2^{32}$ | 14 | $\approx 2^{32}$ | 13 |

| | | \multicolumn{10}{c|}{A = 3} |
|---|---|---|---|---|---|---|---|---|---|---|---|
| | | $L = 2^8$ | | $L = 2^{16}$ | | $L = 2^{32}$ | | $L = 2^{64}$ | | $L = 2^{128}$ | |
| n | log q | b | max D | b | max D | b | max D | b | max D | b | max D |
| 2048 | 60 | 2 | 2 | 2 | 2 | 2 | 2 | 2 | 2 | 2 | 2 |
| 4096 | 116 | 5 | 2 | 5 | 5 | 2 | 5 | 2 | 5 | 3 | 5 |
| 8192 | 226 | 4 | 10 | 7 | 10 | 6 | 9 | 21 | 9 | 19 | 8 |
| 16384 | 435 | 128 | 13 | 2048 | 13 | 724 | 12 | 431 | 11 | 332 | 10 |
| 32768 | 890 | $\approx 2^{28}$ | 16 | $\approx 2^{22}$ | 15 | $\approx 2^{19}$ | 14 | $\approx 2^{35}$ | 14 | $\approx 2^{33.5}$ | 13 |

| | | \multicolumn{10}{c|}{A = 10} |
|---|---|---|---|---|---|---|---|---|---|---|---|
| | | $L = 2^8$ | | $L = 2^{16}$ | | $L = 2^{32}$ | | $L = 2^{64}$ | | $L = 2^{128}$ | |
| n | log q | b | max D | b | max D | b | max D | b | max D | b | max D |
| 2048 | 60 | 2 | 2 | 2 | 2 | 2 | 2 | 2 | 2 | 2 | 2 |
| 4096 | 116 | 2 | 5 | 2 | 5 | 2 | 5 | 2 | 5 | 3 | 5 |
| 8192 | 226 | 4 | 9 | 5 | 9 | 10 | 9 | 7 | 8 | 25 | 8 |
| 16384 | 435 | 128 | 12 | 512 | 12 | 91 | 11 | 1447 | 11 | 609 | 10 |
| 32768 | 890 | $\approx 2^{28}$ | 15 | $\approx 2^{16}$ | 14 | $\approx 2^{26}$ | 14 | $\approx 2^{21}$ | 13 | $\approx 2^{37}$ | 13 |

A comparison of Table 2 and Table 3 above shows that, for performing encrypted arithmetic on both small and large integers, the new FVb scheme significantly outperforms the FV scheme with the NAF encoding. The difference becomes particularly strong when more additions are performed at each level, as the previous FV scheme suffers from the coefficient growth due to noise increase resulting from multiplication operations. For example, when A=10 the FV scheme only allows to evaluate regular circuits of depth at most three (3), even with the smallest input size being considered, whereas the new FVb scheme allows up to depth 15, which is a significant increase in performance.

Even though the comparison of the FV and the FVb schemes focuses on integer arithmetic, a generalization to rational number inputs, with a generalization of the NAF or other integer encoders being used with the FV scheme would yield similar results. This is because the performance of the fractional encoders is close, but not equivalent, to what can be obtained by simply scaling the rational numbers to integers, and then operating on the integers. In this setting the comparison becomes slightly more cumbersome, as one needs to decide also how the polynomial coefficients are to be divided between the integral and the fractional part. For example, the polynomial can be divided into two parts of roughly equal size (as described above).

Additionally, the parameters used for comparison are estimated to have a very high security level against recent types of attacks on encrypted data, and the new FVb scheme will perform better in comparison to the FV scheme when using lower-security parameters. For a fixed n and σ, a lower security level corresponds to using a larger q, which has a smaller initial noise. Thus, there is more room for homomorphic operations noise-wise. This is a benefit of the new FVb scheme, allowing deeper circuits to be evaluated. In the FV scheme, increasing the depth requires t to be substantially larger, which directly affects the noise growth in homomorphic multiplications, and quickly makes any increase in the noise ceiling irrelevant.

Figure 2:
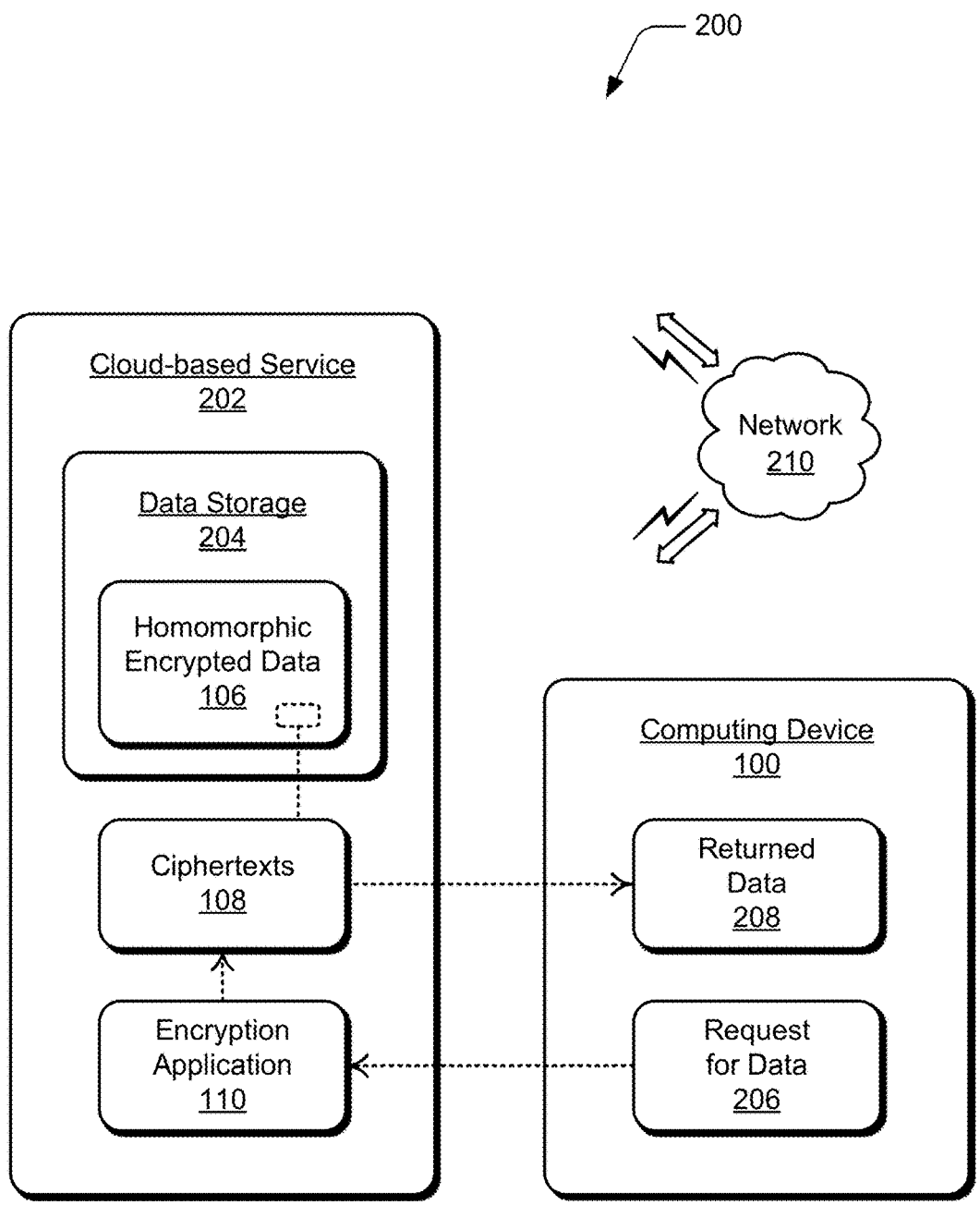
FIG. 2 illustrates an example system in which aspects of high-precision rational number arithmetic in homomorphic encryption can be implemented as described herein.

FIG. 2 illustrates an example system 200 in which aspects of high-precision rational number arithmetic in homomorphic encryption can be implemented as described herein. The example system 200 includes the computing device 100 that is shown and described with reference to FIG. 1. The example system also includes a cloud-based service 202 that is accessible by computing devices, to include the computing device 100. The cloud-based service 202 includes data storage 204 that may be implemented as any suitable memory, memory device, or electronic data storage for network-based storage. The data storage 204 can store the homomorphic encrypted data 106. The cloud-based service 202 can also implement an instance of the encryption application 110, as shown and described with reference to FIG. 1.

In this instance, the encryption application 110 can receive a request for data 206 from the computing device

100, such as a query of the homomorphic encrypted data 106 in the dataset. The encryption application 110 can then apply one or more of the various homomorphic encryption algorithms 124 shown and described with reference to FIG. 1, such as performing the homomorphic operations 112. The encryption application 110 can implement the techniques described herein to encrypt the data, perform the homomorphic operations 112 on the encrypted data, and decrypt the data 206, returning the requested data to the computing device 100 as the returned data 208.

The cloud-based service 202 can also be implemented with server devices that are representative of one or multiple hardware server devices of the service. Further, the cloud-based service 202 can be implemented with various components, such as a processing system and memory, as well as with any number and combination of different components as further described with reference to the example device shown in FIG. 5 to implement the services, applications, servers, and other features of high-precision rational number arithmetic in homomorphic encryption. Other aspects of high-precision rational number arithmetic in homomorphic encryption as described herein can be implemented by the encryption application 110 at the cloud-base service and/or may be implemented in conjunction with the encryption application 110 that is implemented by the computing device 100, as shown and described with reference to FIG. 1.

The example system 200 also includes a network 210, and any of the devices, servers, and/or services described herein can communicate via the network, such as for data communication between the computing device 100 and the cloud-based service 202. The network 210 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example methods 300 and 400 are described with reference to respective FIGS. 3 and 4 in accordance with one or more aspects of high-precision rational number arithmetic in homomorphic encryption. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
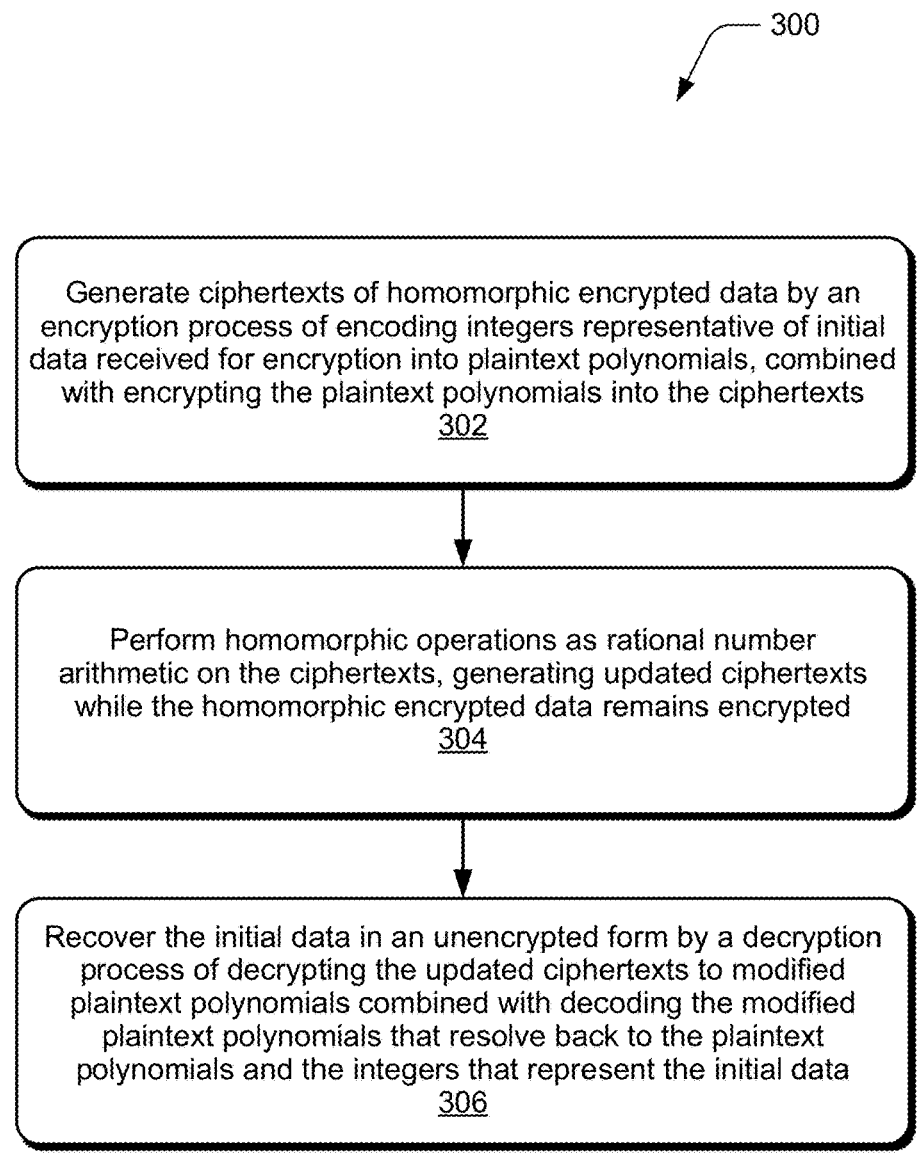
FIG. 3 illustrates an example method of high-precision rational number arithmetic in homomorphic encryption in accordance with techniques described herein.

FIG. 3 illustrates an example method 300 for high-precision rational number arithmetic in homomorphic encryption, and is generally described with reference to the encryption application implemented by a computing device and/or server device. The order in which the method is described is not intended to be construed as a limitation, and any number or combination of the method operations can be performed in any order to implement a method, or an alternate method.

At 302, ciphertexts of homomorphic encrypted data are generated by an encryption process of encoding integers representative of initial data received for encryption into plaintext polynomials, combined with encrypting the plaintext polynomials into the ciphertexts. For example, the encryption application 110 that is implemented by the computing device 100 and/or by the cloud-based service 202 utilizes the integer encoder 116 and the encryption algorithm 120 to generate the ciphertexts 108 of the homomorphic encrypted data 106 by an encryption process of encoding integers representative of the initial data 114 that is received for encryption into the plaintext polynomials 118, combined with encrypting the plaintext polynomials into the ciphertexts 108. In an implementation, generating the ciphertexts 108 encrypts the homomorphic encrypted data 106 based on the Fan-Vercauteren (FV) homomorphic encryption scheme with the plaintext polynomials defined as $\mathbb{Z}/(b''+1)\mathbb{Z}$ in the FVb encryption scheme, including having replaced coefficients reduced integer modulo t of the plaintext polynomials $\mathbb{Z}_t[x]/(x''+1)$ in the FV plaintext space with (x–b).

At 304, homomorphic operations are performed as rational number arithmetic on the ciphertexts, generating updated ciphertexts while the homomorphic encrypted data remains encrypted. For example, the encryption application 110 that is implemented by the computing device 100 and/or by the cloud-based service 202 performs the homomorphic operations 112, such as multiplication operations and rational number arithmetic, on the ciphertexts 108 of the homomorphic encrypted data 106. In aspects of the previous FV homomorphic encryption scheme, the ciphertexts 108 are susceptible to a noise increase contributed by the multiplication operations. However, the noise increase that is contributed by the multiplication operations is optimized effective to maximize a multiplicative depth of the homomorphic operations performed on encrypted rational numbers.

At 306, the initial data is recovered in an unencrypted form by a decryption process of decrypting the updated ciphertexts to modified plaintext polynomials combined with decoding the modified plaintext polynomials that resolve back to the plaintext polynomials and the integers that represent the initial data. For example, the encryption application 110 that is implemented by the computing device 100 and/or by the cloud-based service 202 utilizes the decryption algorithm 128 to recover the initial data 114 in an unencrypted form by a decryption process of decrypting the updated ciphertexts 108 to modified plaintext polynomials 130 combined with decoding the modified plaintext polynomials that resolve back to the plaintext polynomials 118 and the integers that represent the initial data.

Figure 4:
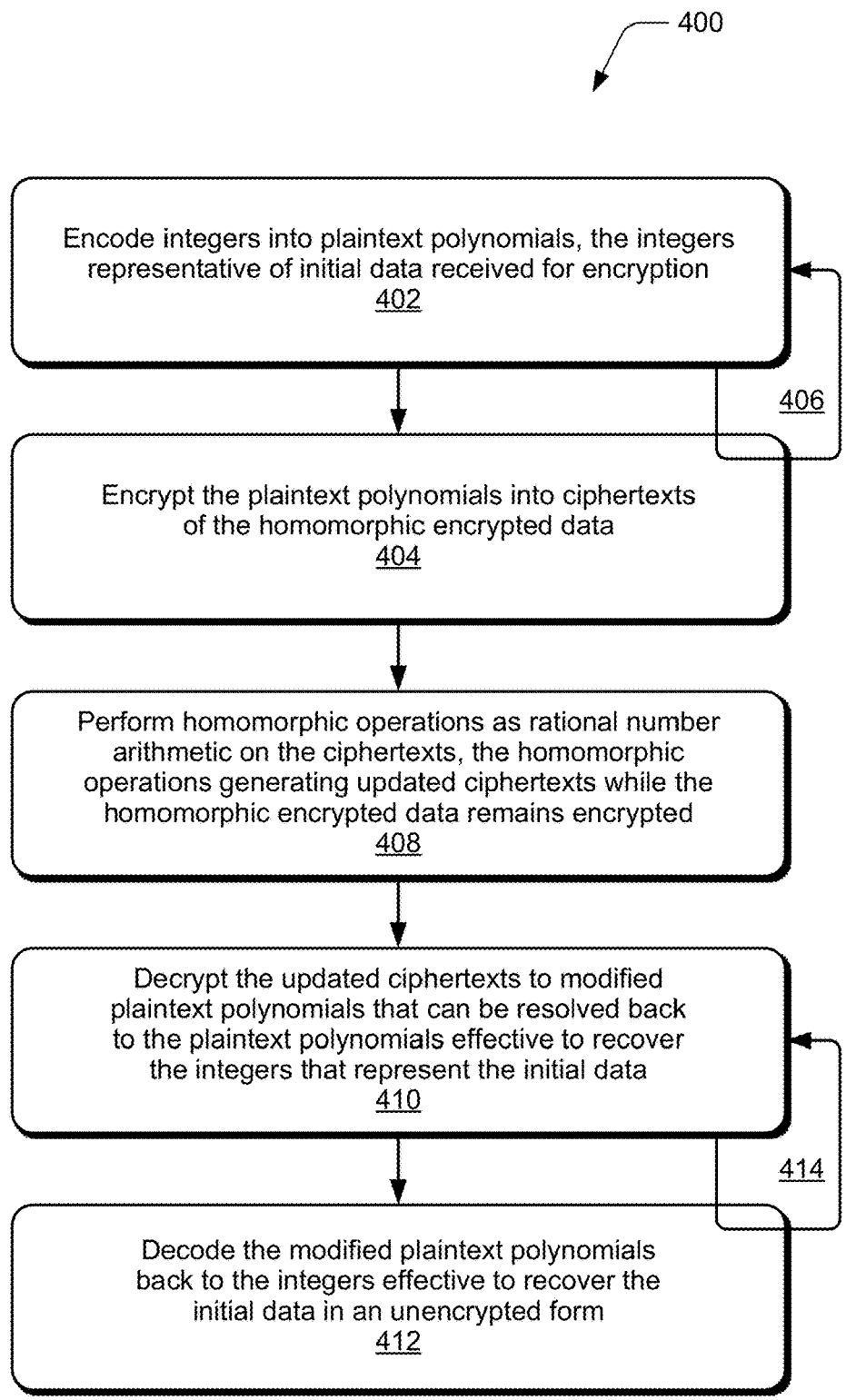
FIG. 4 illustrates an example method of high-precision rational number arithmetic in homomorphic encryption in accordance with techniques described herein.

FIG. 4 illustrates an example method 400 for high-precision rational number arithmetic in homomorphic encryption, and is generally described with reference to the encryption application implemented by a computing device and/or server device. The order in which the method is described is not intended to be construed as a limitation, and any number or combination of the method operations can be performed in any order to implement a method, or an alternate method.

At 402, integers are encoded into plaintext polynomials, the integers representative of initial data received for encryption. For example, the encryption application 110 that is implemented by the computing device 100 and/or by the cloud-based service 202 utilizes the integer encoder 116 to encode integers that are representative of the initial data 114 received for encryption into the plaintext polynomials 118. In an FV homomorphic encryption scheme, the encryption application 110 encodes the integers as the plaintext polynomials 118, defining the plaintext polynomials as $\mathbb{Z}_t[x]/(x^n+1)$ with coefficients reduced integer modulo t.

At 404, the plaintext polynomials are encrypted into ciphertexts of the homomorphic encrypted data. For example, the encryption application 110 that is implemented by the computing device 100 and/or by the cloud-based service 202 utilizes the encryption algorithm 120 to encrypt the plaintext polynomials 118 into the ciphertexts 108 of the homomorphic encrypted data 106. In aspects of the FVb homomorphic encryption scheme, the encryption application 110 encrypts the plaintext polynomials 118 into the ciphertexts, allowing for homomorphic evaluation of large ciphertext polynomials on rational numbers. Replacing the t modulus of the plaintext polynomials $\mathbb{Z}_t[x]/(x^n+1)$ in the FV plaintext space with (x−b) in the FVb encryption scheme is effective to minimize t and allow homomorphic evaluation of large ciphertext polynomials on encrypted rational numbers, as well as increase processing efficiency of the homomorphic encryption scheme.

The homomorphic encrypted data 106 is encrypted based on the Fan-Vercauteren (FV) homomorphic encryption scheme with the plaintext polynomials 118 defined as $\mathbb{Z}/(b^n+1)\mathbb{Z}$ in an FVb encryption scheme, including having replaced coefficients reduced integer modulo t of the plaintext polynomials $\mathbb{Z}_t[x]/(x^n+1)$ in the FV plaintext space with (x−b). The polynomials of the ciphertexts 108 of the homomorphic encrypted data 106 are encrypted in log base two ($\log_2$) with coefficients of the encrypted polynomials being less than or equal to one. In the techniques described herein, the encryption application 110 initiates a combined process as represented at 406 to encode the integers into the plaintext polynomials 118 and encrypt the plaintext polynomials 118 into the ciphertexts 108 as a combined process to generate the ciphertexts 108 of the homomorphic encrypted data 106.

At 408, homomorphic operations are performed as rational number arithmetic on the ciphertexts, the homomorphic operations generating updated ciphertexts while the homomorphic encrypted data remains encrypted. For example, the encryption application 110 that is implemented by the computing device 100 and/or by the cloud-based service 202 performs the homomorphic operations 112, such as multiplication operations and rational number arithmetic, on the ciphertexts 108 of the homomorphic encrypted data 106. In aspects of the FV homomorphic encryption scheme, the ciphertexts 108 are susceptible to a noise increase contributed by the multiplication operations. However, the noise increase that is contributed by the multiplication operations is optimized effective to maximize a multiplicative depth of the homomorphic operations performed on encrypted rational numbers.

At 410, the updated ciphertexts are decrypted to modified plaintext polynomials that can be resolved back to the plaintext polynomials effective to recover the integers that represent the initial data. For example, the encryption application 110 that is implemented by the computing device 100 and/or by the cloud-based service 202 utilizes the decryption algorithm 128 to decrypt the updated ciphertexts 108 back to the modified plaintext polynomials 130 that can then be resolved back to the plaintext polynomials 118 effective to recover the integers that represent the initial data 114.

At 412, the modified plaintext polynomials are decoded back to the integers effective to recover the initial data in an unencrypted form. For example, the encryption application 110 that is implemented by the computing device 100 and/or by the cloud-based service 202 utilizes the decryption algorithm 128 to decode the modified plaintext polynomials 130 back to the integers effective to recover the initial data 114 in an unencrypted form. In aspects of the techniques described herein, the encryption application 110 initiates a combined process as represented at 414 to decrypt the updated ciphertexts 108 back to the modified plaintext polynomials 130 and decode the modified plaintext polynomials to recover the initial data 114 in the unencrypted form.

Figure 5:
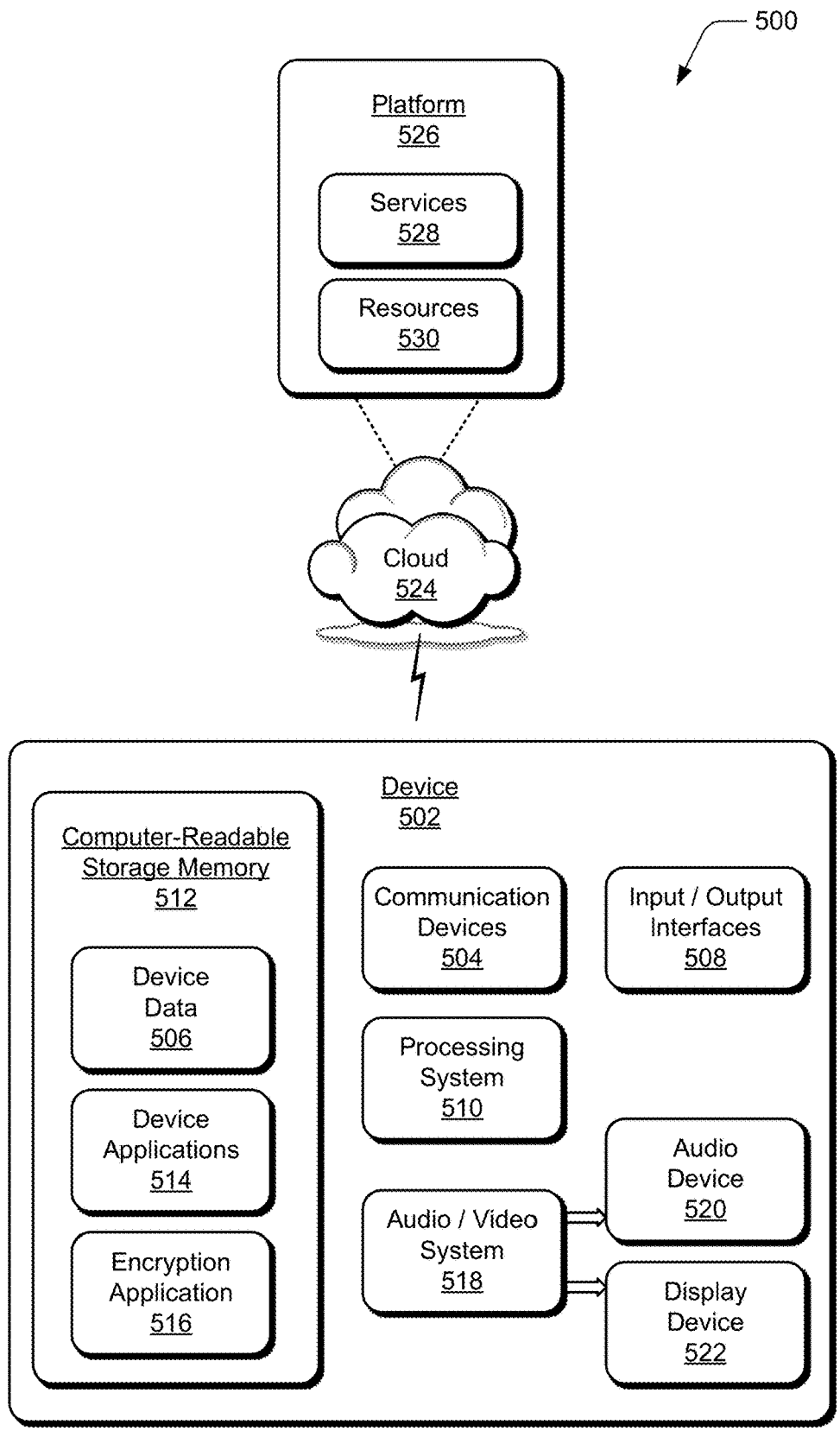
FIG. 5 illustrates an example system with an example device that can implement high-precision rational number arithmetic in homomorphic encryption as described herein.

FIG. 5 illustrates an example system 500 that includes an example device 502, which can implement aspects of high-precision rational number arithmetic in homomorphic encryption. The example device 502 can be implemented as any of the computing devices, user devices, and server devices described with reference to the previous FIGS. 1-4, such as any type of mobile device, wearable device, client device, mobile phone, tablet, computing, communication, entertainment, gaming, media playback, and/or other type of device. For example, the computing device and server device described herein may be implemented as the example device 502 or with various components of the example device.

The device 502 includes communication devices 504 that enable wired and/or wireless communication of device data 506, such as homomorphic encrypted data, dataset bits of the homomorphic encrypted data, ciphertexts, and any other type of data related to homomorphic encrypted data and queries. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include an encryption application 516 that implements the features and techniques of high-precision rational number arithmetic in homomorphic encryption, such as when the example device 502 is implemented as the computing device 100 and/or as a server device of the cloud-based service 202 described herein with reference to FIGS. 1-4. Examples of the encryption application 516 include the encryption application 110 implemented by the computing device 100 as described with reference to FIG. 1, and the encryption application 110 implemented by a server device of the cloud-based service 202 as described with reference to FIG. 2.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In aspects of high-precision rational number arithmetic in homomorphic encryption, at least part of the techniques described herein may be implemented in a distributed system, such as over a "cloud" 524 in a platform 526. The cloud 524 includes and/or is representative of the platform 526 for services 528 and/or resources 530. The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud.

Although aspects of high-precision rational number arithmetic in homomorphic encryption have been described in language specific to features and/or methods, the appended claims are not necessarily limited to the specific features or methods described. Rather, the specific features and methods are disclosed as example implementations of high-precision rational number arithmetic in homomorphic encryption, and other equivalent features and methods are intended to be within the scope of the appended claims.

Further, various different embodiments are described and it is to be appreciated that each described embodiment can be implemented independently or in connection with one or more other described embodiments. Additional aspects of the techniques, features, and/or methods discussed herein relate to one or more of the following:

A computing device implemented for high-precision rational number arithmetic in homomorphic encryption, the computing device comprising: a memory configured to store homomorphic encrypted data as a dataset; a processor system configured to execute an encryption application that is implemented to: encode integers into plaintext polynomials, the integers representative of initial data received for encryption; encrypt the plaintext polynomials into ciphertexts of the homomorphic encrypted data; perform homomorphic operations as rational number arithmetic on the ciphertexts, generating updated ciphertexts while the homomorphic encrypted data remains encrypted; decrypt the updated ciphertexts to modified plaintext polynomials that can be resolved back to the plaintext polynomials effective to recover the integers that represent the initial data; and decode the modified plaintext polynomials back to the integers effective to recover the initial data in an unencrypted form.

Alternatively or in addition to the above described computing device, any one or combination of: the encryption application is implemented to encode the integers into the plaintext polynomials and encrypt the plaintext polynomials into the ciphertexts as a combined process to generate the ciphertexts of the homomorphic encrypted data. The encryption application is implemented to decrypt the updated ciphertexts to the modified plaintext polynomials and decode the modified plaintext polynomials as a combined process to recover the initial data in the unencrypted form. The encryption application is implemented to encode the integers as the plaintext polynomials and encrypt the plaintext polynomials into the ciphertexts effective to allow homomorphic evaluation of large ciphertext polynomials on rational numbers. The encryption application is implemented to maximize a multiplicative depth of a homomorphic computation performed on the rational numbers. The homomorphic encrypted data is encrypted based on a Fan-Vercauteren (FV) homomorphic encryption scheme with the plaintext polynomials defined as $\mathbb{Z}/(b^n+1)\mathbb{Z}$ in an FVb encryption scheme, including having replaced coefficients reduced integer modulo t of the plaintext polynomials $\mathbb{Z}_t[x]/(x^n+1)$ in the FV plaintext space with (x−b). The polynomials of the ciphertexts of the homomorphic encrypted data are encrypted in log base two ($\log_2$) with coefficients of the encrypted polynomials being less than or equal to one. The encryption application is implemented to replace the t modulus of the plaintext polynomials $\mathbb{Z}_t[x]/(x^n+1)$ in the FV plaintext space with (x−b) effective to minimize t and allow homomorphic evaluation of large ciphertext polynomials on encrypted rational numbers. The encryption application is implemented to: perform multiplication operations on the ciphertexts as the homomorphic operations, the ciphertexts of the homomorphic encrypted data being susceptible to a noise increase contributed by the multiplication operations on the ciphertexts; and optimize the noise increase in the ciphertexts contributed by the multiplication operations, effective to maximize a multiplicative depth of the homomorphic operations performed on encrypted rational numbers. The t modulus of the plaintext polynomials being replaced with (x−b) allows optimization of the noise increase in the ciphertexts utilizing a large b value.

A method of high-precision rational number arithmetic in homomorphic encryption, the method comprising: encoding integers into plaintext polynomials, the integers representative of initial data received for encryption; encrypting the plaintext polynomials into ciphertexts of the homomorphic encrypted data; performing homomorphic operations as rational number arithmetic on the ciphertexts, the homomorphic operations generating updated ciphertexts while the homomorphic encrypted data remains encrypted; decrypting the updated ciphertexts to modified plaintext polynomials that can be resolved back to the plaintext polynomials effective to recover the integers that represent the initial data; and decoding the modified plaintext polynomials back to the integers effective to recover the initial data in an unencrypted form.

Alternatively or in addition to the above described method, any one or combination of: the encoding the integers as the plaintext polynomials and the encrypting the plaintext polynomials into the ciphertexts allow homomorphic evaluation of large ciphertext polynomials on rational numbers. The homomorphic encrypted data is encrypted based on a Fan-Vercauteren (FV) homomorphic encryption scheme with the plaintext polynomials defined as $\mathbb{Z}/(b^n+1)\mathbb{Z}$ in an FVb encryption scheme, including having replaced coefficients reduced integer modulo t of the plaintext polynomials $\mathbb{Z}_t[x]/(x^n+1)$ in the FV plaintext space with $(x-b)$. The polynomials of the ciphertexts of the homomorphic encrypted data are encrypted in log base two ($\log_2$) with coefficients of the encrypted polynomials being less than or equal to one. The method further comprising replacing the t modulus of the plaintext polynomials $\mathbb{Z}_t[x]/(x^n+1)$ in the FV plaintext space with $(x-b)$ in the FVb encryption scheme is effective to minimize t and allow homomorphic evaluation of large ciphertext polynomials on encrypted rational numbers. The method further comprising performing multiplication operations on the ciphertexts as the homomorphic operations, the ciphertexts of the homomorphic encrypted data being susceptible to a noise increase contributed by the multiplication operations on the ciphertexts; and optimizing the noise increase in the ciphertexts contributed by the multiplication operations, effective to maximize a multiplicative depth of the homomorphic operations performed on encrypted rational numbers. The t modulus of the plaintext polynomials being replaced with $(x-b)$ allows optimization of the noise increase in the ciphertexts utilizing a large b value.

A method of high-precision rational number arithmetic in homomorphic encryption, the method comprising: generating ciphertexts of homomorphic encrypted data by an encryption process of encoding integers representative of initial data received for encryption into plaintext polynomials, combined with encrypting the plaintext polynomials into the ciphertexts; performing homomorphic operations as rational number arithmetic on the ciphertexts, generating updated ciphertexts while the homomorphic encrypted data remains encrypted; and recovering the initial data in an unencrypted form by a decryption process of decrypting the updated ciphertexts to modified plaintext polynomials combined with decoding the modified plaintext polynomials that resolve back to the plaintext polynomials and the integers that represent the initial data.

Alternatively or in addition to the above described method, any one or combination of: the generating the ciphertexts encrypts the homomorphic encrypted data based on a Fan-Vercauteren (FV) homomorphic encryption scheme with the plaintext polynomials defined as $\mathbb{Z}/(b^n+1)\mathbb{Z}$ in an FVb encryption scheme, including having replaced coefficients reduced integer modulo t of the plaintext polynomials $\mathbb{Z}_t[x]/(x^n+1)$ in the FV plaintext space with $(x-b)$. The homomorphic operations are multiplication operations performed on the ciphertexts of the homomorphic encrypted data, the ciphertexts of the homomorphic encrypted data being susceptible to a noise increase contributed by the multiplication operations on the ciphertexts; and the method further comprising optimizing the noise increase in the ciphertexts contributed by the multiplication operations, effective to maximize a multiplicative depth of the homomorphic operations performed on encrypted rational numbers.

The invention claimed is:

1. A computing device implemented for high-precision rational number arithmetic in homomorphic encryption, the computing device comprising:
   a memory configured to store homomorphic encrypted data as a dataset;
   a processor system configured to execute an encryption application that is implemented to:
      encode integers into plaintext polynomials, the integers representative of initial data received for encryption, wherein the plaintext polynomials comprise coefficients reduced integer modulo t;
      encrypt the plaintext polynomials into ciphertexts of the homomorphic encrypted data, wherein encrypting the plaintext polynomials into the ciphertexts comprises replacing each coefficient reduced integer modulo t with a polynomial;
      perform homomorphic operations as rational number arithmetic on the ciphertexts, generating updated ciphertexts while the homomorphic encrypted data remains encrypted;
      decrypt the updated ciphertexts to modified plaintext polynomials encoding the plaintext polynomials; and
      decode the modified plaintext polynomials back to the integers to recover the initial data in an unencrypted form, wherein the encryption application is implemented to encode the integers as the plaintext polynomials and encrypt the plaintext polynomials into the ciphertexts to allow homomorphic evaluation of ciphertext polynomials on rational numbers.

2. The computing device as recited in claim 1, wherein the encryption application is implemented to encode the integers into the plaintext polynomials and encrypt the plaintext polynomials into the ciphertexts as a combined process to generate the ciphertexts of the homomorphic encrypted data.

3. The computing device as recited in claim 1, wherein the encryption application is implemented to decrypt the updated ciphertexts to the modified plaintext polynomials and decode the modified plaintext polynomials as a combined process to recover the initial data in the unencrypted form.

4. The computing device as recited in claim 1, wherein the encryption application is implemented to maximize a multiplicative depth of a homomorphic computation performed on the rational numbers.

5. The computing device as recited in claim 1, wherein the homomorphic encrypted data is encrypted based on a Fan-Vercauteren (FV) homomorphic encryption scheme with the plaintext polynomials defined as $\mathbb{Z}/(b^n+1)\mathbb{Z}$ in an FVb encryption scheme, and wherein replacing each coefficient reduced integer modulo t comprises replacing each coefficient reduced integer modulo t with $(x-b)$.

6. The computing device as recited in claim 5, wherein polynomials of the ciphertexts of the homomorphic encrypted data are encrypted in log base two (log 2) with coefficients of the encrypted polynomials being less than or equal to one.

7. The computing device as recited in claim 5, wherein the encryption application is implemented to replace the t modulus of the plaintext polynomials $\mathbb{Z}_t[x]/(x^n+1)$ in the FV plaintext space with (x−b) to minimize t and allow homomorphic evaluation of ciphertext polynomials on encrypted rational numbers.

8. The computing device as recited in claim 5, wherein the encryption application is implemented to:
perform multiplication operations on the ciphertexts as the homomorphic operations, the ciphertexts of the homomorphic encrypted data being susceptible to a noise increase contributed by the multiplication operations on the ciphertexts; and
optimize the noise increase in the ciphertexts contributed by the multiplication operations to maximize a multiplicative depth of the homomorphic operations performed on encrypted rational numbers.

9. The computing device as recited in claim 8, wherein the t modulus of the plaintext polynomials being replaced with (x−b) allows optimization of the noise increase in the ciphertexts.

10. A method of high-precision rational number arithmetic in homomorphic encryption, the method comprising:
accessing an encryption application at a computing device;
encoding integers into plaintext polynomials by the encryption application, the integers representative of initial data received for encryption, and wherein the plaintext polynomials comprise coefficients reduced integer modulo t;
encrypting the plaintext polynomials into ciphertexts of homomorphic encrypted data, wherein encrypting the plaintext polynomials into the ciphertexts comprises replacing each coefficient reduced integer modulo t with a polynomial;
performing homomorphic operations as rational number arithmetic on the ciphertexts, the homomorphic operations generating updated ciphertexts while the homomorphic encrypted data remains encrypted;
decrypting the updated ciphertexts to modified plaintext polynomials encoding the plaintext polynomials; and
decoding the modified plaintext polynomials back to the integers to recover the initial data in an unencrypted form, wherein encoding the integers as the plaintext polynomials and encrypting the plaintext polynomials into the ciphertexts allows homomorphic evaluation of ciphertext polynomials on rational numbers.

11. The method as recited in claim 10, wherein the homomorphic encrypted data is encrypted based on a Fan-Vercauteren (FV) homomorphic encryption scheme with the plaintext polynomials defined as $\mathbb{Z}/(b^n+1)\mathbb{Z}$ in an FVb encryption scheme, and wherein replacing each coefficient reduced integer modulo t comprises replacing each coefficient reduced integer modulo t with (x−b).

12. The method as recited in claim 11, wherein polynomials of the ciphertexts of the homomorphic encrypted data are encrypted in log base two (log 2) with coefficients of the encrypted polynomials being less than or equal to one.

13. The method as recited in claim 11, further comprising:
replacing the t modulus of the plaintext polynomials $\mathbb{Z}_t[x]/(x^n+1)$ with (x−b) in the FVb encryption scheme to minimize t and allow homomorphic evaluation of ciphertext polynomials on encrypted rational numbers.

14. The method as recited in claim 11, further comprising:
performing multiplication operations on the ciphertexts as the homomorphic operations, the ciphertexts of the homomorphic encrypted data being susceptible to a noise increase contributed by the multiplication operations on the ciphertexts; and
optimizing the noise increase in the ciphertexts contributed by the multiplication operations to maximize a multiplicative depth of the homomorphic operations performed on encrypted rational numbers.

15. The method as recited in claim 14, wherein the t modulus of the plaintext polynomials being replaced with (x−b) allows optimization of the noise increase in the ciphertexts.

16. A method of high-precision rational number arithmetic in homomorphic encryption, the method comprising:
accessing an encryption application at a computing device;
generating, by the encryption application, ciphertexts of homomorphic encrypted data to encode integers representative of initial data received for encryption into plaintext polynomials comprising coefficients reduced integer modulo t, combined with encrypting the plaintext polynomials into the ciphertexts;
wherein encrypting the plaintext polynomials into the ciphertexts comprises replacing the t modulus with a polynomial;
performing homomorphic operations as rational number arithmetic on the ciphertexts, generating updated ciphertexts while the homomorphic encrypted data remains encrypted; and
recovering the initial data in an unencrypted form by a decryption process of decrypting the updated ciphertexts to modified plaintext polynomials combined with decoding the modified plaintext polynomials that resolve back to the plaintext polynomials and the integers that represent the initial data, wherein encoding the integers as the plaintext polynomials and encrypting the plaintext polynomials into the ciphertexts allows homomorphic evaluation of ciphertext polynomials on rational numbers.

17. The method as recited in claim 16, wherein the generating the ciphertexts encrypts the homomorphic encrypted data based on a Fan-Vercauteren (FV) homomorphic encryption scheme with the plaintext polynomials defined as $\mathbb{Z}/(b^n+1)\mathbb{Z}$ in an FVb encryption scheme, and wherein replacing each coefficient reduced integer modulo t comprises replacing each coefficient reduced integer modulo t with (x−b).

18. The method as recited in claim 17, wherein:
the homomorphic operations are multiplication operations performed on the ciphertexts of the homomorphic encrypted data, the ciphertexts of the homomorphic encrypted data being susceptible to a noise increase contributed by the multiplication operations on the ciphertexts; and
optimizing the noise increase in the ciphertexts contributed by the multiplication operations to maximize a multiplicative depth of the homomorphic operations performed on encrypted rational numbers.

\* \* \* \* \*